US010043369B2

United States Patent
Hopkins et al.

(10) Patent No.: US 10,043,369 B2
(45) Date of Patent: Aug. 7, 2018

(54) SYSTEM AND METHOD FOR SENDING MEDICAL EMERGENCY ALERTS

(71) Applicant: Better Alerts, LLC, Newtown Square, PA (US)

(72) Inventors: Douglas Hopkins, Newtown Square, PA (US); Shareif Hall, Sicklerville, NJ (US); Robert J McNeill, Sicklerville, NJ (US)

(73) Assignee: BETTER ALERTS, LLC, Newtown Square, PA (US)

( * ) Notice: Subject to any disclaimer, the term of this patent is extended or adjusted under 35 U.S.C. 154(b) by 0 days.

(21) Appl. No.: 14/664,778

(22) Filed: Mar. 20, 2015

(65) Prior Publication Data

US 2015/0269827 A1      Sep. 24, 2015

Related U.S. Application Data

(60) Provisional application No. 61/968,337, filed on Mar. 20, 2014, provisional application No. 62/006,671, filed on Jun. 2, 2014.

(51) Int. Cl.
*G08B 21/04* (2006.01)
*H04W 4/90* (2018.01)
(Continued)

(52) U.S. Cl.
CPC ..... *G08B 21/0446* (2013.01); *G08B 21/0202* (2013.01); *G08B 21/0227* (2013.01);
(Continued)

(58) Field of Classification Search
CPC ............ G08B 21/0446; G08B 21/0453; G08B 21/22; G08B 21/24; G08B 21/0423;
(Continued)

(56) References Cited

U.S. PATENT DOCUMENTS

| 8,929,853 | B2 | 1/2015 | Butler |
| 2003/0012344 | A1 | 1/2003 | Agarwal et al. |

(Continued)

OTHER PUBLICATIONS

Michael Brown, First Alert Delivers a Connected-Home Portfolio with a Personal Twist: A Smartwatch, TechHive, Jan. 8, 2015, http://www.techhive.com/article/2866806/first-alert-delivers-a-connected-home-portfolio-with-a-personal-twist-a-smartwatch.html.
(Continued)

*Primary Examiner* — An T Nguyen
(74) *Attorney, Agent, or Firm* — Richards Patent Law P.C.

(57) ABSTRACT

A system for sending medical emergency alerts including a device body adapted to be attached to a user, an accelerometer connected to the device body, a wireless communications module, a user interface, a processor in communication with the accelerometer, the wireless communications module, and the user interface, a memory in communication with the processor, the memory including instructions that, when executed by the processor, cause the processor to receive acceleration data from the accelerometer, analyze the acceleration data to determine if a fall condition is present, and when the fall condition is present, communicate, via the wireless communication module, an alert to a caregiver mobile device, wherein the alert is adapted to indicate that the user wearing the device body has fallen.

17 Claims, 18 Drawing Sheets

(51) Int. Cl.
*G08B 21/02* (2006.01)
*H04W 4/80* (2018.01)
*H04W 4/021* (2018.01)
*H04W 4/02* (2018.01)

(52) U.S. Cl.
CPC ..... *G08B 21/0269* (2013.01); *G08B 21/0288* (2013.01); *G08B 21/0294* (2013.01); *H04W 4/90* (2018.02); *H04W 4/021* (2013.01); *H04W 4/027* (2013.01); *H04W 4/80* (2018.02)

(58) Field of Classification Search
CPC .... G08B 21/043; G08B 21/016; G08B 21/02; G08B 25/016
See application file for complete search history.

(56) References Cited

U.S. PATENT DOCUMENTS

| | | | | |
|---|---|---|---|---|
| 2005/0146431 | A1* | 7/2005 | Hastings | A61B 5/002 340/539.12 |
| 2006/0282021 | A1* | 12/2006 | DeVaul | A61B 5/0024 600/595 |
| 2008/0129518 | A1* | 6/2008 | Carlton-Foss | A61B 5/1117 340/573.1 |
| 2008/0238666 | A1* | 10/2008 | Loncar | G06F 19/3456 340/540 |
| 2009/0322515 | A1* | 12/2009 | Kirchner | G01S 19/02 340/539.13 |
| 2009/0322540 | A1* | 12/2009 | Richardson | A61B 5/0002 340/573.7 |
| 2010/0052896 | A1* | 3/2010 | Goodman | G01P 15/00 340/539.11 |
| 2010/0190467 | A1* | 7/2010 | Scott | H04M 1/2745 455/404.2 |
| 2010/0190479 | A1* | 7/2010 | Scott | G06F 17/289 455/414.1 |
| 2010/0283601 | A1* | 11/2010 | Tai | G06Q 50/24 340/539.12 |
| 2010/0286567 | A1* | 11/2010 | Wolfe | A61B 5/1117 600/587 |
| 2011/0025493 | A1* | 2/2011 | Papadopoulos | A61B 5/02427 340/539.12 |
| 2011/0128143 | A1* | 6/2011 | Daniel | G06Q 10/08 340/539.1 |
| 2011/0181422 | A1* | 7/2011 | Tran | G06F 19/3418 340/573.1 |
| 2012/0041278 | A1* | 2/2012 | Sadhu | A61B 5/0006 600/301 |
| 2012/0050034 | A1* | 3/2012 | Hushek | G08B 3/1008 340/539.13 |
| 2012/0105203 | A1 | 5/2012 | Elliot et al. | |
| 2012/0129553 | A1* | 5/2012 | Phillips | G08B 21/0236 455/456.3 |
| 2012/0139731 | A1* | 6/2012 | Razoumov | A61B 5/0022 340/573.1 |
| 2012/0284769 | A1* | 11/2012 | Dixon | H04W 4/021 726/1 |
| 2012/0313785 | A1* | 12/2012 | Hanson | G08B 21/24 340/573.1 |
| 2012/0314901 | A1* | 12/2012 | Hanson | A61B 5/0077 382/103 |
| 2013/0030931 | A1* | 1/2013 | Moshfeghi | G01S 19/48 705/16 |
| 2013/0110011 | A1* | 5/2013 | McGregor | A61B 5/1118 600/595 |
| 2014/0028456 | A1* | 1/2014 | Sadhu | G08B 21/18 340/539.13 |
| 2014/0062702 | A1* | 3/2014 | Rubio Andres | G08B 21/043 340/573.1 |
| 2014/0143729 | A1* | 5/2014 | Myers | G06Q 50/26 715/835 |
| 2014/0145845 | A1* | 5/2014 | Sattari | G08B 21/24 340/539.13 |
| 2014/0323079 | A1* | 10/2014 | Paolini | G08B 25/016 455/404.2 |
| 2014/0327540 | A1* | 11/2014 | Shin | G08B 21/0446 340/539.11 |
| 2015/0223022 | A1* | 8/2015 | Kumar | H04W 4/021 455/456.1 |
| 2015/0269824 | A1* | 9/2015 | Zhang | G08B 21/0438 340/539.12 |
| 2015/0269827 | A1* | 9/2015 | Hopkins | H04W 4/90 340/539.12 |

OTHER PUBLICATIONS

Laurie Orlov, Five (pretty smart) watches—acknowledging that seniors exist, Aging in Place, Mar. 19, 2015, http://www.ageinplacetech.com/blog/five-pretty-smart-watches-acknowledging-seniors-exist?utm_source=feedburner&utm_medium=email&utm_campaign=Feed%3A+AgingInPlaceTechnologyWatch+%28Aging+In+Place+Technology+Watch%29.

Nick Wingfield, Start-Up Disguises Wearable Tech as Jewelry, The New York Times, Bits Blog, Feb. 21, 2014, http://bits.blogs.nytimes.com/2014/02/21/start-up-disguises-wearable-tech-as-jewelry/?_r=0.

Adario Strange, iPhone Connected Jewelry: Wireless Security Alerts, High Fashion, Mashable, Feb. 18, 2014, http://mashable.com/2014/02/18/high-fashion-meets-bluetooth/.

Leena Rao, Cuff Blends Jewelry with a Wearable Alert System, Tech Crunch, Feb. 18, 2014, http://techcrunch.com/2014/02/18/cuff-blends-jewelry-with-a-wearable-alert-system/.

* cited by examiner

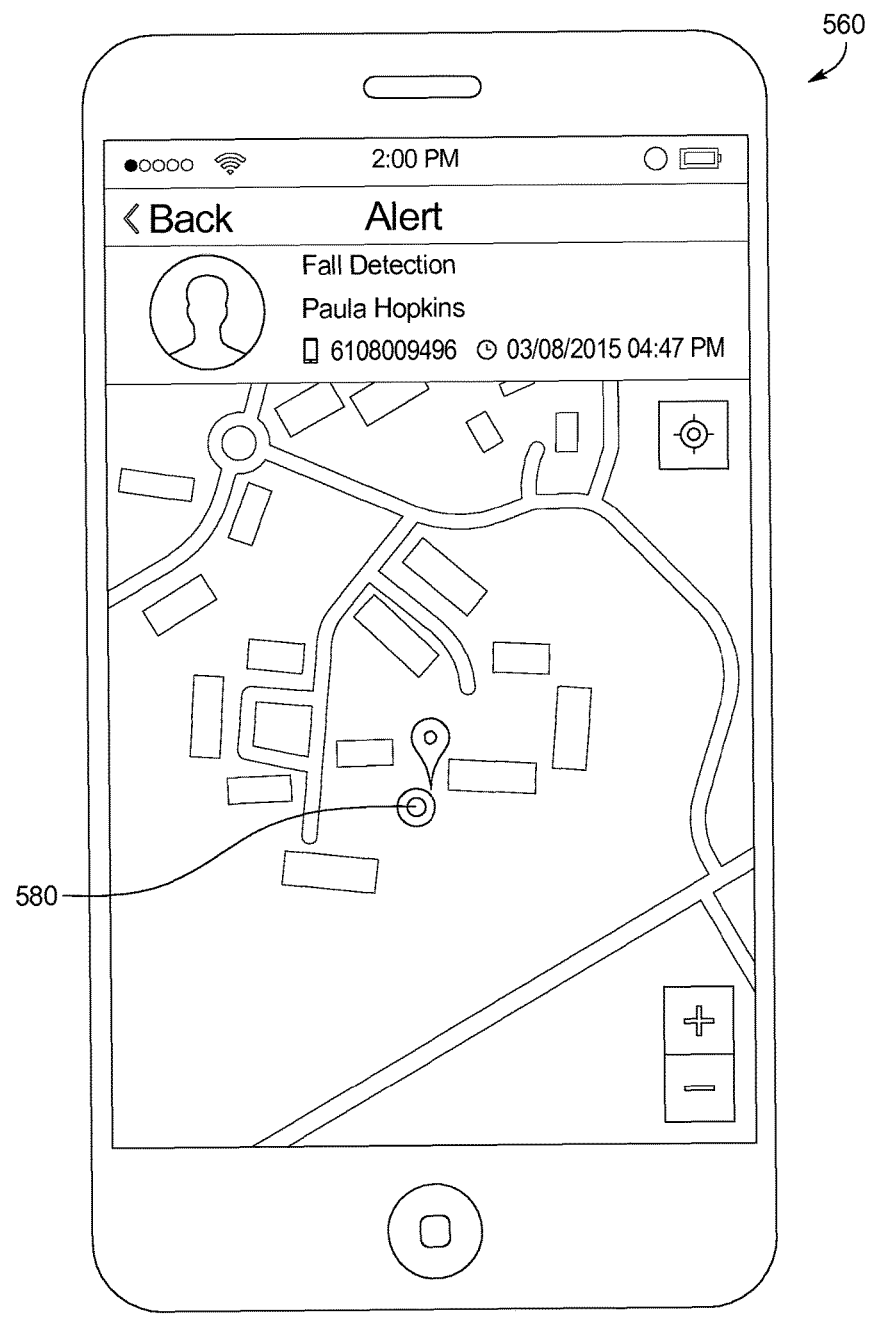

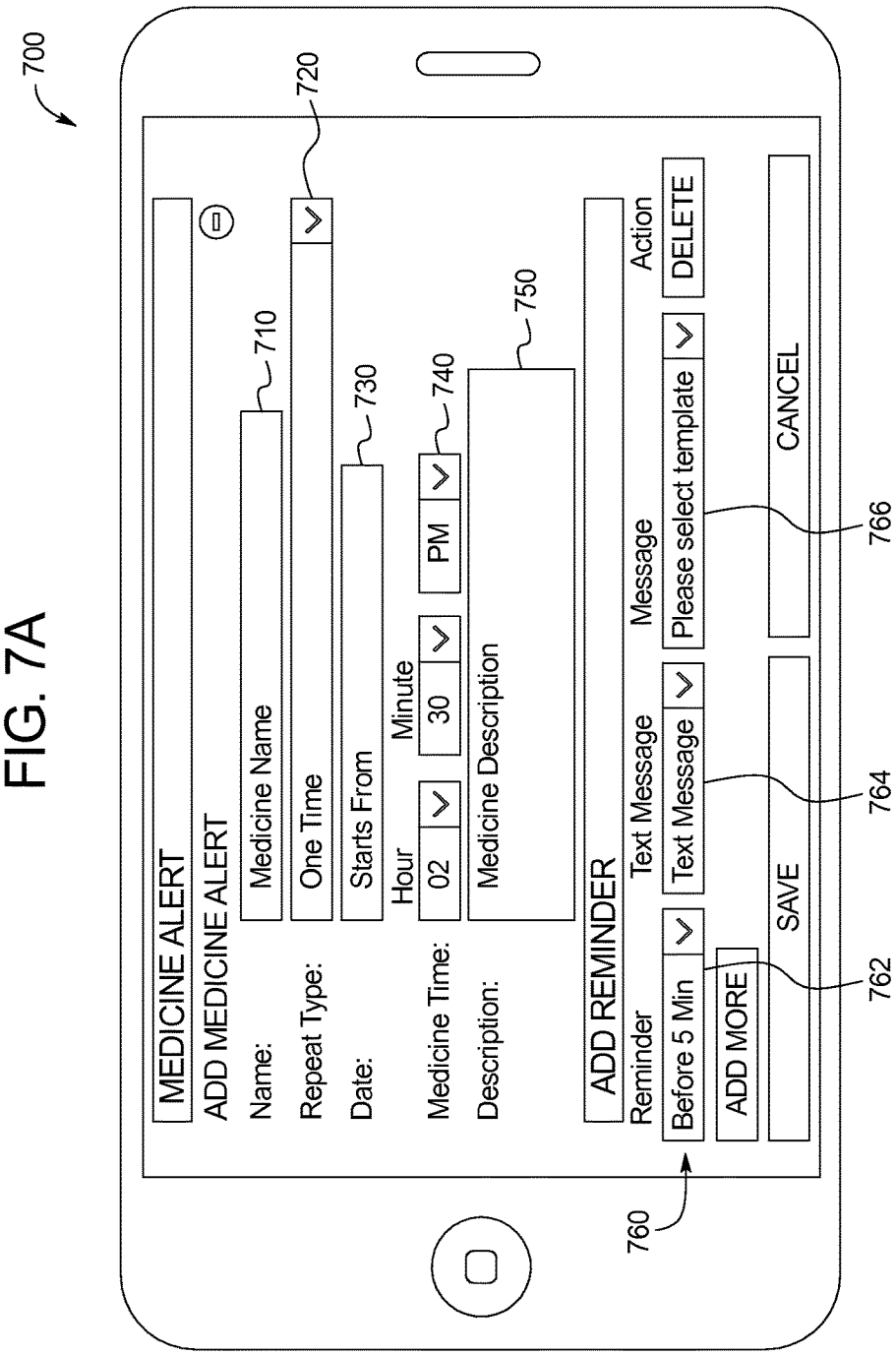

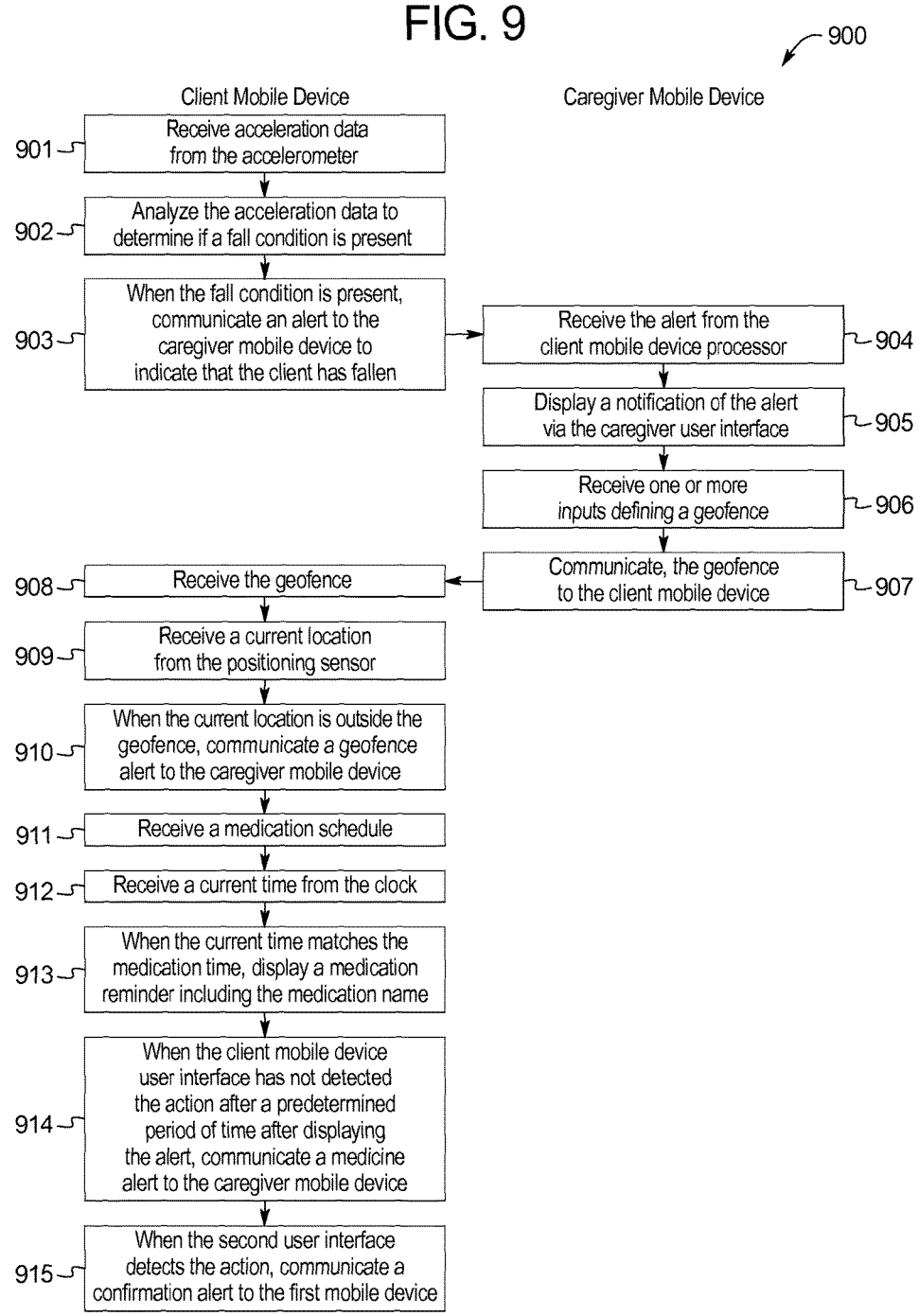

SYSTEM AND METHOD FOR SENDING MEDICAL EMERGENCY ALERTS

CROSS-REFERENCE TO RELATED APPLICATIONS

This application incorporates by reference and claims the benefit of priority to U.S. Provisional Patent Application No. 61/968,337 filed Mar. 20, 2014, and U.S. Provisional Patent Application No. 62/006,671 filed Jun. 2, 2014.

BACKGROUND OF THE INVENTION

The present subject matter relates generally to a system for providing emergency medical assistance in the event of an accidental fall, mental incapacity or other crises. More specifically, the present invention relates to a system and method using a watch, mobile application, and website to allow users to contact caregivers, family members, an Emergency Response Center Operator, or a 911 line in the event of a medical emergency, and that is also enabled to send alerts without user commands.

Emergency alarm systems have long been a fixture in the homes of elderly individuals. But these systems have significant drawbacks that limit their effectiveness. For instance, these systems may not be accessible throughout the user's home, and the user would not hear the speaker on the system when a caregiver is trying to make contact. And if the user fell in a part of the house away from the speaker, the user would not be able to communicate with the caregiver. Also, traditional systems require landline telephones. If the landline is out, so is the system. Furthermore, the cost of maintaining a landline, along with the monthly cost of the system, may be significant, especially for elderly users on a fixed income.

Traditional alarm systems are also sometimes limited in their functionality. For example they may always require user input, such as the user pressing a button to activate the system. But user input may not be possible in a situation where an individual becomes unconscious prior to alerting the system. Additionally, a user command will not be provided if the user is unaware that he or she is putting himself in danger. For example, an individual with dementia may not understand the consequences of venturing beyond the confines of the user's home, and would therefore not alert family members and caregivers of a potentially life-threatening situation.

Accordingly, there is a need for an alert system that is mobile, convenient, easy to use, and capable of detecting crisis situations without a user command, as described herein.

BRIEF SUMMARY OF THE INVENTION

To meet the needs described above and others, the present disclosure provides an alert system that is mobile, convenient, easy to use, and capable of detecting crisis situations without a user command.

The alert system may include a wrist-based monitor, such as a watch or a pendant (herein, a watch), worn by the client. The watch may detect whether the client has fallen and send an alert to a caregiver via a caregiver mobile device. A caregiver may include any person with responsibility over the client, or any emergency contact of the client. In some embodiments, the system may include a client mobile device to provide a bridge for the watch to communicate to the caregiver mobile device and to carry out other functionality of the alert system. The alert system may include, or interoperate with, one or more alert system servers that may provide communication between the client mobile device and the caregiver mobile device.

The caregiver may set up a safe zone to help to prevent a client from wandering away from a safe location and provide a notification to the caregiver if the client does leave the safe zone. The safe zone may be defined as a geofence and, when the client passes outside the safe zone, the caregiver may be alerted. Additionally, the alert system may permit the client or the caregiver to define medicine alerts to remind the client to take his or her medications. The alert system may also permit the caregiver to track the client's exercise activity via exercise alerts and the client's vitals, such as the heat rate via a heart rate alert.

The alert system servers may provide a web site to permit the client and caregivers to access the functionality of the system over the web. The alert system servers may include a database to store information related to the functionality of the alert system, such as alerts, customized profile information, medication schedules, activity records, client vitals, etc.

In an embodiment, the watch may be a commercially available watch sold under the Pebble® brand including a watch application. Similarly, in other embodiments, the watch may be a commercially available watch sold under the Apple® Watch brand, Android Wear® or any other wearable capable of executing a watch application. The watch may include Bluetooth, cellular, Wi-Fi and other wireless communication capabilities so that it may communicate with a corresponding client mobile device and/or other components of the alert system. For ease and convenience of use, the watch may be equipped with a long battery life and it may be waterproof.

In an embodiment, a watch may include a user interface, user controls, an accelerometer, a vibrating motor, a microphone, and a pedometer all provided in the form of a watch. In some embodiments, the watch may include a heart rate monitor. It is contemplated that in some embodiments the watch incorporates some or all of the functionality of the client mobile device. Accordingly, the watch may additionally include any or all of the components of the client mobile device.

In an embodiment, the client mobile device is a mobile device including the client mobile application. Likewise, the caregiver mobile device may be a mobile device including the caregiver mobile application. The client mobile device and the caregiver mobile device may be mobile devices such as an iOS®, Android®, Windows, or other commercially available or special purpose mobile device. The caregiver mobile application may permit the caregiver to receive and manage alerts such as fall alerts, medicine alerts, safe zone alerts, exercise alerts, etc. Additionally, the caregiver may use the caregiver mobile application to access view client data, such as activity data, and manage settings of the client mobile application.

Both the client mobile application and the caregiver mobile application may be Bluetooth, cellular, and/or Wifi-enabled. And both may be enabled for short message services (SMS), MMS, email, and phone calls. By providing an alert system including a watch in communication with a client mobile device, the client will not need a landline to operate the alert system. The client mobile application and the caregiver mobile application may use voice and data capabilities to send SMS messages, push notifications, email alerts, and to place a series of calls to the primary caregiver or an emergency operator to resolve a crisis. Additionally, the client mobile application may also be configured to initiate a mobile call between the client mobile device and caregiver mobile device when the alert button has been pressed and when the accelerometer detects a fall. This will allow the client to hear and communicate with the caregiver.

The watch may include a watch face including a display screen to display the time, date, and the number of steps the client has taken that day. When in distress, the client may use the watch to send an alert to the caregiver or to call an emergency operator, such as 911. In an embodiment, the watch may include an alert button that the client may press to send an emergency alert to the caregiver. When the client presses the alert button, an emergency alert message is displayed on the caregiver mobile device. Further, the caregiver mobile application may receive alerts, such as a safe zone alert, a medicine alert, a fall alert, an operator alert, an exercise alerts, a heart rate alert, etc.

Additionally, the watch may include an emergency button that the client may press to be connected to an emergency operator, such as 911 or an Emergency Response Center. In an embodiment, when the emergency button is pressed, the watch may trigger the client mobile device to initiate a call with the emergency operator. Alternatively, when the watch has mobile call functionality, it may directly initiate a call with the emergency operator. When the emergency button is pressed an emergency alert may be sent to the caregiver mobile device along with the client's location. The emergency alert may be displayed on the lock screen of the caregiver mobile device or through any other notification mechanism, as will be recognized by those skilled in the art based on the teachings herein.

To setup a connection between the client and the caregiver using the alert system, the client and caregiver may each first register with alert system. The client and the caregiver may input profile information, such as a name, email, gender, address, mobile number, etc. that may be stored on the alert system servers. Once both the client and the caregiver are registered, the client may associate her profile with profile of the caregiver to permit the caregiver to receive alerts from the client.

Once the caregiver is associated with a client, the client or caregiver may choose the medium of the alerts. For example, the caregiver may choose to receive the alerts as an email, text message, phone call, any two, or all three. The client or the caregiver may further customize the text of each alert to match his or her specific needs. For example, the client or the caregiver may input a fall alert message for a fall alert, a safe zone message for a safe zone alert, a customized medicine alert message for a medicine alert, an emergency operator alert message for an operator alert, an exercise alert message for an exercise alert, an emergency alert message for an emergency alert, a heart rate alert message for a heart rate alert, etc.

When the alert system detects a fall, the alert system may send a fall alert message to the caregiver mobile device. Additionally, in some embodiments, the client mobile device may initiate a phone call with the caregiver mobile device in response to a fall alert. To detect falls, the watch may include an accelerometer. The accelerometer may be a three-axis accelerometer that records the client's movements. The sensitivity of the accelerometer may allow the alert system to monitor the client's movements and detect a fall condition. The processor may analyze the client's movements using a fall detection algorithms to determine if the client has fallen by meeting a fall condition. For example, a fall may be determined when the magnitude and/or direction of an acceleration, the rate of change of acceleration, or other measured motion of the watch exceeds a threshold or matches a predetermined pattern. In some embodiments, fall detection may be implemented using a 3-D gyroscope in place of or in addition to the accelerometer.

The fall alert may be sent as an SMS message including the fall alert message. The fall alert message may include a map link to a GPS map to permit a caregiver to access a map showing the current location of the client. Likewise, in an email message screen, the fall alert message may be sent as an email message. The email message may also include a map link. It is contemplated that any alert of the alert system may be sent as an SMS message, push notification, and/or email message and may include a map or map link. The caregiver may open the map to view the client's location at the time of an alert. When the client moves, the map may be updated to permit the caregiver to track the client.

An alert history screen may include a list of alerts recorded by the alert system, such as, safe zone alerts, medicine alerts, fall alerts, operator alerts, exercise alerts, emergency alerts, heart rate alerts, etc. Further, the alert system may include collect activity data through the all sensors of the alert system including those in the watch or the client mobile device and may include the activity data inclusion in the alert history screen. Additionally, the alert system may provide a mechanism to allow client and their family members or caregivers to generate reports on client activity.

In some embodiments, after sending a fall alert to the caregiver mobile device, the alert system may send the display screen on the watch or the client mobile device a message to request that the verify her safety. If the client fails to respond by pressing a specified one of the user controls, the situation may be treated as a crisis and the caregiver may be alerted via the caregiver mobile device. In some embodiments, when the system detects a fall, the client mobile application may open an Emergency Contacts screen to permit the client to call for help.

The alert system may additionally include a safe zone to prevent a client from wandering away from a safe location. The safe zone may be defined as a geofence. The alert system may monitor the client's location and if the client passes outside the safe zone, the caregivers may be alerted. The watch may also include a vibrating motor that may work in conjunction with the safe zone, such that the motor activates when the client leaves the safe zone to encourage the client to return to the safe zone.

In an embodiment, the safe zone may be a circular geofence centered on the address of the client. For example, the caregiver may define a fence of meters around the client's residence. The caregiver may input a zone diameter and an address to fully encompass the client's safe location and a zone description of the safe zone. Additionally, the caregiver may specify the medium type of the safe zone alert that is triggered when the client leaves the safe zone. For example, the caregiver may choose between receiving push notifications, email alerts, text message alerts, or all message types. The caregiver may also select the contents of the safe zone alert using the text message selection and the email message selection.

The client or the caregiver may create medicine alerts and reminders to periodically remind the clients to take her medications. A Medicine Alerts screen may accept the input of the medicine name, dose, the repeat type (such as one time, daily, weekly, etc.), the start date, the medicine take time (the time the medication is be taken), and a medicine description.

The client or caregiver may also configure a reminder that may be sent to the client on the client mobile device. In an embodiment, when the client dismisses the reminder a medicine alert may be sent to the caregiver mobile device to confirm that the medication was taken. The medicine alert may also be added to an activity report. Additionally, in an embodiment, when the client fails to respond to the reminder for longer than a predetermined period of time, the alert system may send a medicine alert to caregiver mobile device indicating that the client has failed to take the scheduled medication and is not being compliant with their profile.

The watch may work in conjunction with the client mobile application and alert system servers to record data regarding the client's daily movements. This activity data may be gathered through the use of a pedometer on the watch. The watch may transmit the activity data to the client mobile device and then relayed back to the client via notifications and messages regarding daily steps. The alert system may further analyze this data to learn more about the user's movements and identify potential crises.

To complement the recording of activity data, the client mobile application may further include exercise alerts and exercise reminders to encourage the client to maintain activity. The client mobile application may be used to set time-based exercise reminders to the client to perform scheduled exercises. The client mobile application may monitor the activity of the watch, for example, via a watch-based pedometer, to assist in confirmation of the activity. A record of the measured activity may be transmitted to the alert system servers as confirmation or may be sent to a caregiver as an exercise alert to ensure compliance. The client mobile application may also prompt the client to confirm that the exercise has been completed.

For example, the client may select a running button to record a session of running or walking. To record the activity, the pedometer of the watch may record the number of steps taken during the session. Alternatively, the client may be prompted to enter the number of steps or the amount of time spent walking. As another example, the client may select to record a session of cycling using the cycling button.

The client or caregiver may access an activity report screen to view an activity report of the activity recorded by the alert system. Activities in the activity report may include any activities tracked by the alert system, for example, in some embodiments, walking, cycling, running, etc. The activity report may be shared with the caregiver for verification, encouragement, etc. The activity report may also highlight goals, illustrate progress towards goals, and otherwise encourage the client to continue with scheduled activity. Similar reports may be generated for medicine alerts to record the compliance of the client with a medication schedule.

The alert system may additionally monitor the user's heart rate. The heart rate may be measured by a heart rate sensor on the watch and periodically and routinely transmitted to the alert system servers. If the heart rate goes above or below pre-determined thresholds the caregiver may be alerted. For example, if the heart rate exceeds one hundred beats per minute (bpm), or falls below sixty bpm, the caregiver may be alerted with a heart rate alert.

In an embodiment, a system for sending medical emergency alerts includes: a device body adapted to be attached to a user; an accelerometer connected to the device body; a first mobile device including a first wireless communication module, a first user interface, a first memory, and a first processor in communication with the first wireless communication module, the first user interface, and the first memory; a second wireless communications module; a second user interface; a second processor in communication with the accelerometer, the wireless communications module, and the user interface; a second memory in communication with the processor, the memory including instructions that, when executed by the processor, cause the processor to receive acceleration data from the accelerometer, analyze the acceleration data to determine if a fall condition is present, and when the fall condition is present, communicate, via the second wireless communication module, an alert to the first mobile device, wherein the alert is adapted to indicate that the user wearing the device body has fallen; and wherein the first memory includes instructions that, when executed by the first processor, cause the first processor to receive the alert via the second wireless communication device, and display a notification of the alert via the first user interface.

In some embodiments, the alert system may further include a positioning sensor in communication with the second processor, wherein the first memory includes further instructions that cause the first processor to: receive one or more inputs defining a geofence, and communicate the geofence to the second processor via the first wireless communication module, and wherein the second memory includes further instructions that cause the second processor to: receive the geofence via the second wireless communication module, receive a current location from the positioning sensor, and when the current location is outside the geofence, communicate a geofence alert to the first processor, wherein the first processor displays a notification of the geofence alert on the first user interface.

In some embodiments, the second wireless communications module, the second user interface, the second processor, and the second memory are connected to the device body.

And, in some embodiments, the second wireless communications module, the second user interface, the second processor, and the second memory are connected to a second mobile device, wherein the second mobile device is distinct from the device body. Also, in some embodiments, the system further includes a clock in communication with the second processor, wherein at least one of the second memory and the first memory include instruction to: receive a medication schedule, wherein the medication schedule includes a medicine name and a medication time, wherein the second memory includes instructions to: receive a current time from the clock, when the current time matches the medication time, displaying a medication reminder on the second user interface including the medication name, wherein the reminder includes a request to the user to confirm that the medication has be taken, wherein the request is satisfied when the user performs an action, when the second user interface has not detected the action after a predetermined period of time after displaying the medication reminder, communicate a medicine alert to the first mobile device, wherein the medicine alert includes a notification of the user's failure to confirm that the medication has been taken.

In some embodiments, the second memory further includes instruction to: when the second user interface detects the action, communicate a medicine confirmation alert to the first mobile device. And, in some embodiments, the system further includes a mobile telephone unit in communication with the second processor, wherein the mobile telephone unit is adapted to provide mobile telephone call functionality, wherein when the fall condition is present, initiating a mobile telephone call with an emergency service line. Similarly, in some embodiments, the system further includes a second mobile telephone unit in communication with the second processor, further including a first mobile telephone unit in communication with the first processor, wherein the second mobile telephone unit and the first mobile telephone unit are adapted to provide mobile telephone call functionality, wherein, when a fall condition is present, initiating a mobile telephone call between the second mobile telephone unit and the first mobile telephone unit.

In some embodiments, the system further includes a pedometer in communication with the second processor. And, in some embodiments, the system further includes a heart rate monitor in communication with the processor.

An object of the invention is to provide a solution to medical emergency alerts that is portable, easy to use, and convenient. By using a watch that can stay with the user at all times and a wireless phone that may also move to wherever the user is, the system allows the user to communicate effectively with medical personnel.

Another object of the invention is to provide a solution to medical emergency alerts that detects emergencies without requiring an intentional user command to trigger the alert.

An advantage of the invention is that it provides a solution to medical emergency alerts that allows the user to monitor daily activity and exercise.

Another advantage of the invention is that it does not require a landline to communicate medical emergency alerts.

A further advantage of the invention is that it uses fall detection to send alerts in a situation where the user is unconscious or incapacitated.

Yet another advantage of the invention is that it allows caregivers to use GPS to locate the user.

Additional objects, advantages and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 5C is an example map screen of the alert system of FIG. 1 including a map of the client's location.

FIG. 7A is an example medicine alerts screen of the alert system of FIG. 1 for configuring a medicine alert.

FIG. 9 is an example method that may be executed by the alert system of FIG. 1 to carry out the functionality described herein.

DETAILED DESCRIPTION OF THE INVENTION

Figure 1:
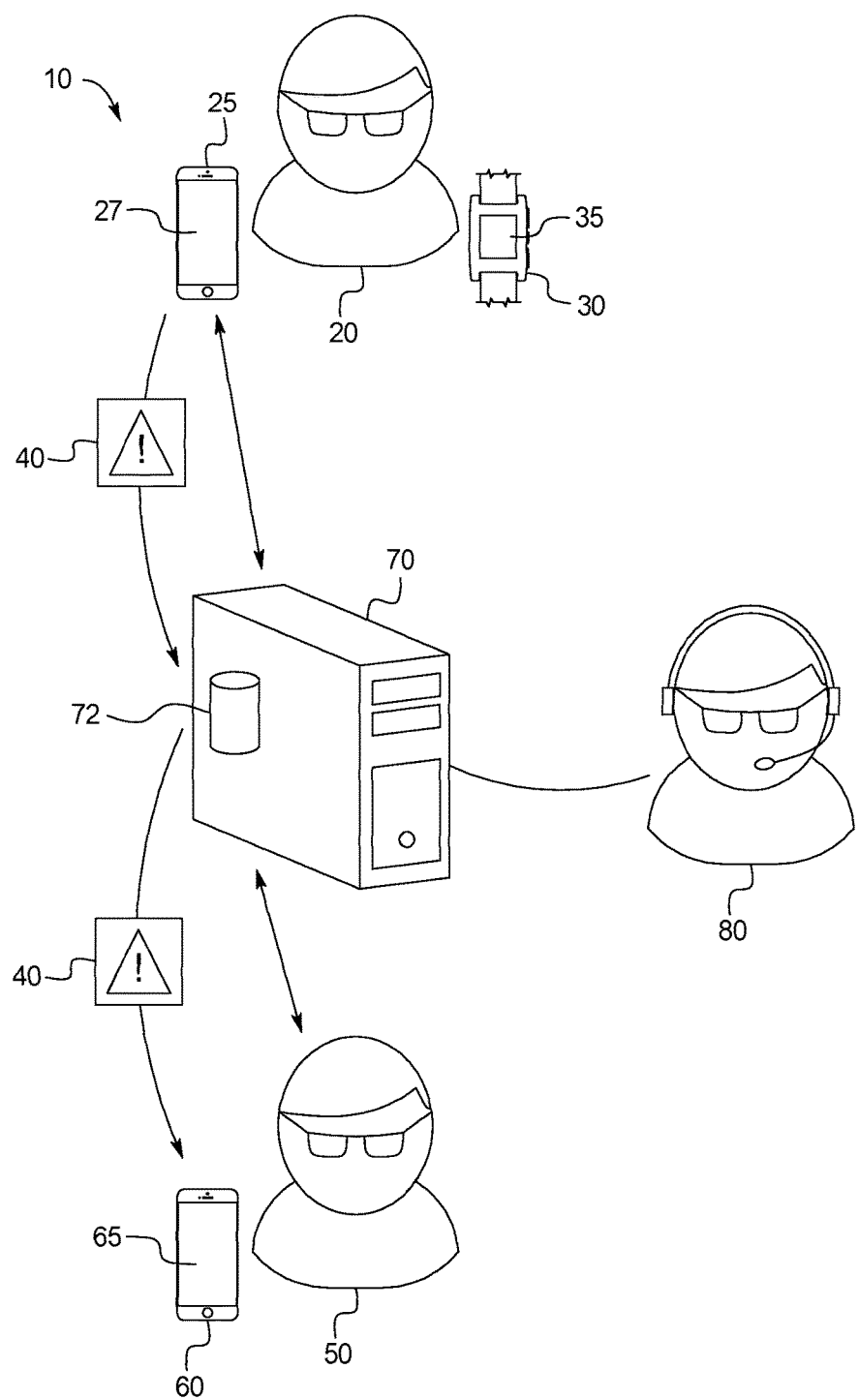
FIG. 1 is a diagram illustrating an example of the alert system.

FIG. 1 illustrates an example of the alert system 10. A client 20 may wear a wrist-based monitor, such as a watch 30 (or, in some embodiments, a pendant). The watch 30 may detect if the client 20 has fallen and send an alert 40 a caregiver 50 via a caregiver mobile device 60. In some embodiments, the system 10 may include a client mobile device 25 to provide a bridge for the watch 30 to communicate to the caregiver mobile device 60 and to carry out other functionality of the alert system 10. The alert system 10 may include or interoperate with one or more alert system servers 70 that may provide communication between the client mobile device 25 and the caregiver mobile device 60.

The caregiver 50 may also set up a safe zone 605 (FIG. 6) to prevent a client 20 from wandering away from a safe location. The safe zone 605 may be defined as a geofence, where if the client 20 passes outside the safe zone 605, the caregiver 50 may be alerted. Additionally, the alert system 10 may permit the client 10 or the caregiver 50 to define medicine alerts 42 to remind the client 20 to take his or her medications. The alert system 10 may also permit the caregiver 50 to track the client's exercise activity via exercise alerts 45 and the client's vitals, such as the heat rate via a heart rate alert 47.

The alert system servers 70 may provide a web site to permit the client 20 and caregivers 50 to access the functionality of the system 10 over the web. The alert system servers 70 may include a database 72 to store information related to the functionality of the alert system 10, such as alerts 40, profile information 410, medication schedules, activity records, client vitals, etc.

In an embodiment, the watch 30 may be a commercially available watch 30 sold under the Pebble® brand including a watch application 35 including computer instructions to provide the functionality described herein. Similarly, in other embodiments, the watch 30 may be a commercially available watch 30 sold under the Apple® Watch brand, Android Wear® brand, or any other SDK smart watch or pendent including computer instructions to provide the functionality described herein. It is contemplated that the watch 30 may be embodied in a variety of commercially available wrist based monitors including computer instructions to provide the functionality described herein, and the examples provided are not meant to limit the alert system 10 to any particular embodiment of the watch 30. The watch 30 may include Bluetooth, cellular, Wi-Fi and other wireless communication capabilities so that it may communicate with a corresponding client mobile device 25 and/or other components of the alert system 10. For ease and convenience of use, the watch 30 may be equipped with a long battery life and it may be waterproof.

Figure 2A:
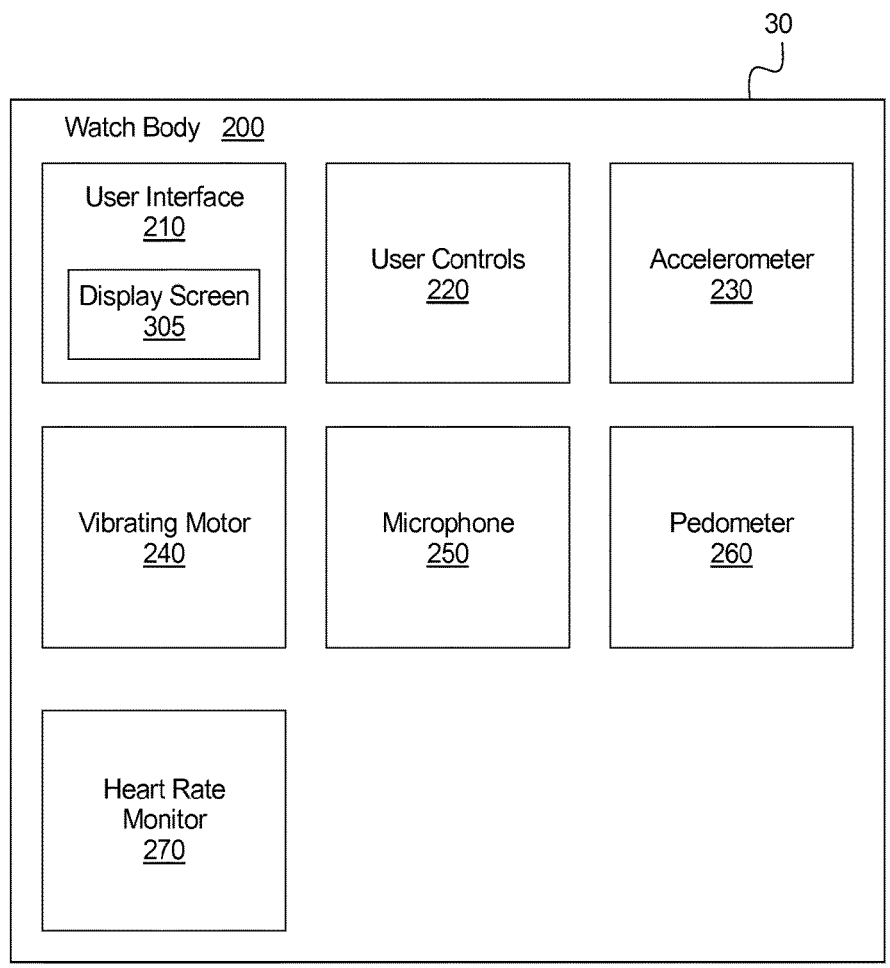
FIG. 2A is a diagram illustrating an example watch of the alert system of FIG. 1.

As shown in FIG. 2A, in an embodiment, a watch 30 may include a user interface 210, user controls 220, an accelerometer 230, a vibrating motor 240, a microphone 250, and a pedometer 260 all mounted on a watch body 200. In some embodiments, the watch 30 may include a heart rate monitor 270, as shown in FIG. 2A. It is contemplated that in some embodiments the watch 30 incorporates some or all of the functionality of the client mobile device 25, accordingly, the watch 30 may additionally include any or all of the components of the client mobile device 25.

Figure 2B:
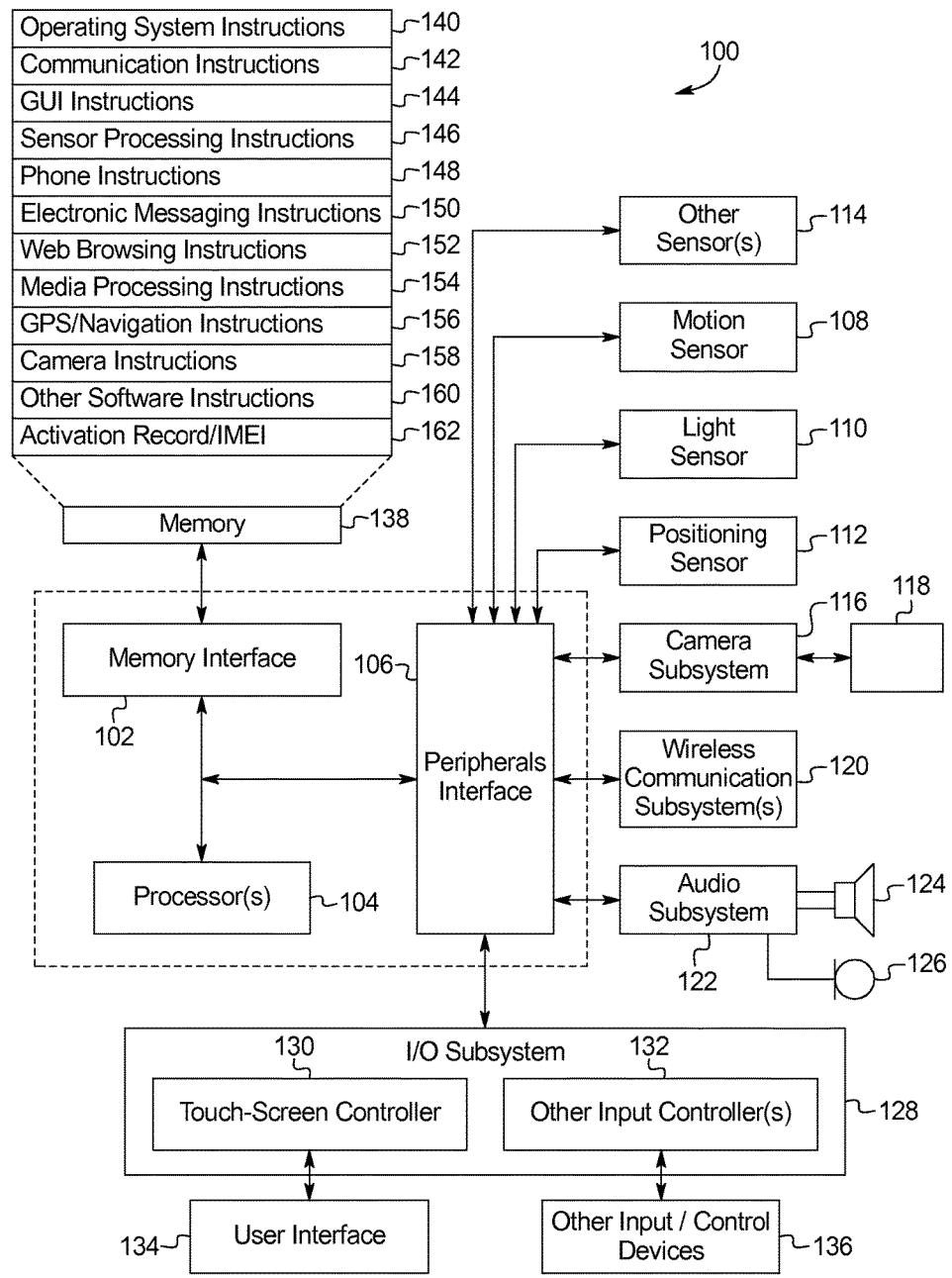
FIG. 2B is a diagram illustrating an example mobile device of the alert system of FIG. 1.

FIG. 2B is a block diagram representation of an example implementation of an example mobile device 100 of the alarm system 10. In an embodiment, the client mobile device 25 is a mobile device 100 including the client mobile application 27. Likewise, in an embodiment, the caregiver mobile device 60 is a mobile device 100 including the caregiver mobile application 65. The client mobile device 25 and the caregiver mobile device 60 may be mobile devices such as an iOS®, Android®, Windows® or other commercially available or special purpose mobile device. The caregiver mobile application 65 may permit the caregiver 50 to receive and manage alerts 40 such as fall alerts 43, medicine alerts 42, safe zone alerts 41, exercise alerts, etc. Additionally, the caregiver 50 may use the caregiver mobile application 65 to access view client data, such as activity data, and manage settings of the client mobile application 27.

Both the client mobile application 27 and the caregiver mobile application 65 may be Bluetooth, cellular, and/or Wifi-enabled. And both may be enabled for short message services (SMS), MMS, email and phone calls. By providing an alert system 10 including a watch 30 in communication with a client mobile device 25, the client 20 will not need a landline to operate the alert system 10. The client mobile application 27 and the caregiver mobile application 65 may use voice and data capabilities to send SMS messages, MMS, push notification, email alerts and to place a series of calls to an emergency operator 80 to resolve a crisis. Additionally, the client mobile application 27 may also be configured to initiate a mobile call between the client mobile device 25 and caregiver mobile device 60 when the alert button 320 has been pressed or when the accelerometer 230 detects a fall. This will allow the client 20 to hear and communicate with the caregiver 50.

Figure 3A:
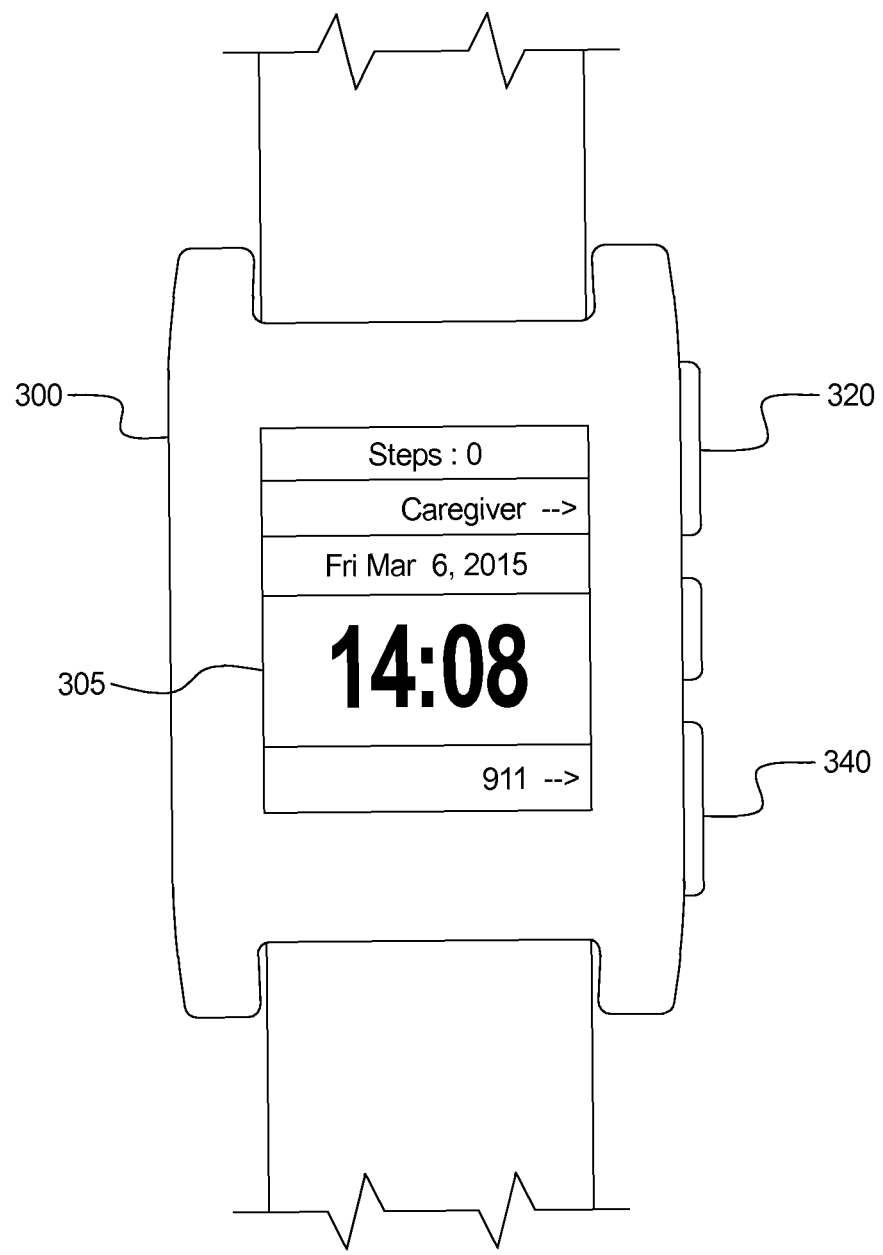
FIG. 3A is an example watch face of a watch of the alert system of FIG. 1.
Figure 3B:
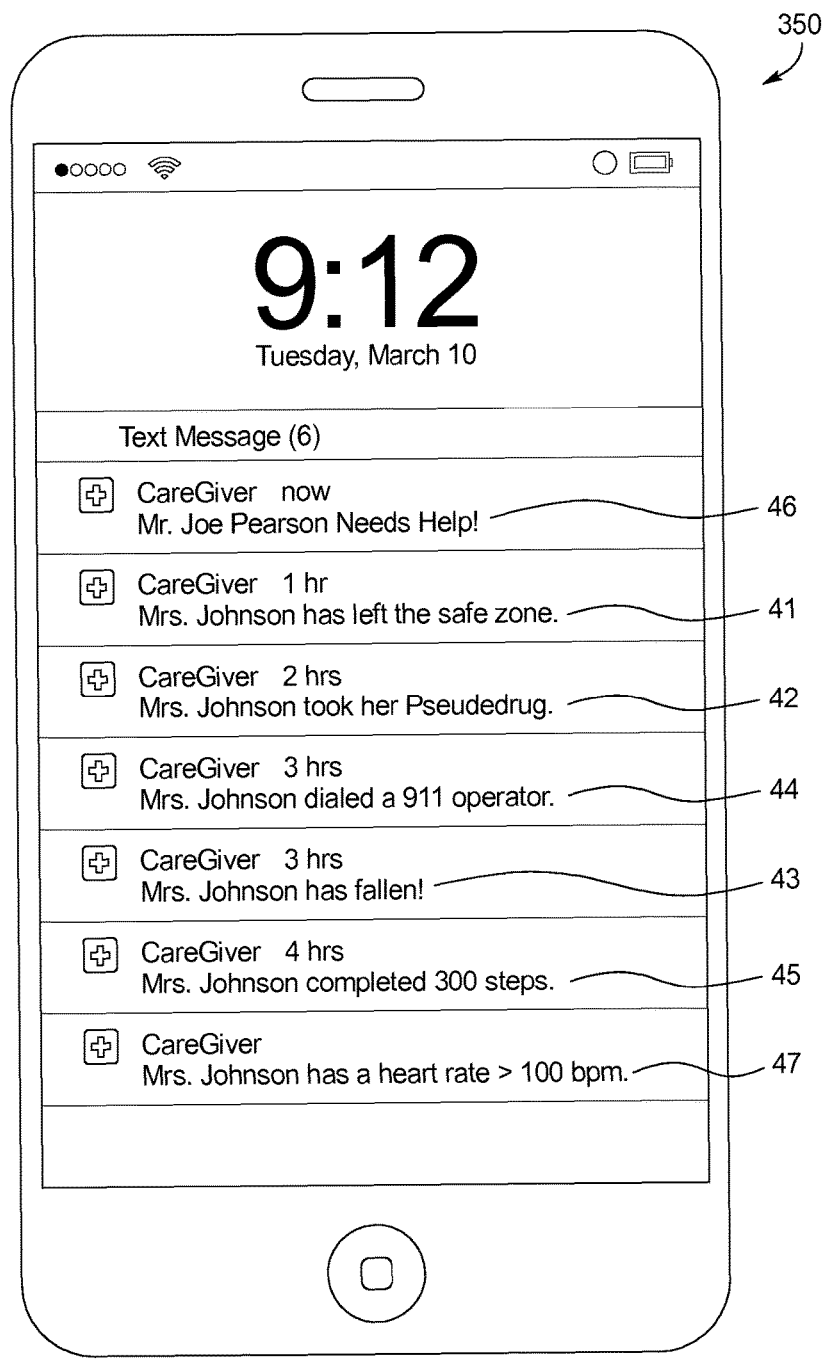
FIG. 3B is an example lock screen illustrating a button press alert message of the alert system of FIG. 1.

FIG. 3A illustrates a watch face 300. As shown, the watch 30 may include a display screen 305 to display the time, date, and the number of steps the client 20 has taken that day. When in distress, the client 20 may use the watch 30 to send an alert to the caregiver 50 or to call 911 or an emergency response center. In an embodiment, the watch 30 may include an alert button 320 that the client 20 may press to send an emergency alert 46 to the caregiver 50. As shown in FIG. 3B on a lock screen, when the client 20 presses the alert button 320, an emergency alert message 360 may be displayed on the caregiver mobile device 60. Further, as shown, and as will be explained further herein, the caregiver mobile application 60 may receive alerts 40, such as a safe zone alert 41, a medicine alert 42, a fall alert 43, an operator alert 44, an exercise alert 45, a heart rate alert 47, etc.

Additionally, the watch 30 may include an emergency button 340 that the client 20 may press to be connected to an emergency operator 80, such as 911 or an Emergency Response center. In an embodiment, when the emergency button 340 is pressed, the watch 30 may trigger the client mobile device 25 to initiate a call with the emergency operator 80. Alternatively, when the watch 30 has mobile call functionality, it may directly initiate a call with the emergency operator 80. As shown in FIG. 3B, when the emergency button 340 is pressed (or, in an embodiment, pressed twice) an emergency alert 46 may be sent to the caregiver mobile device 60 and the mobile device 60 of emergency contacts along with the client's location 580. The emergency alert 46 may be displayed on the lock screen 350 of the caregiver mobile device 60.

Figure 4A:
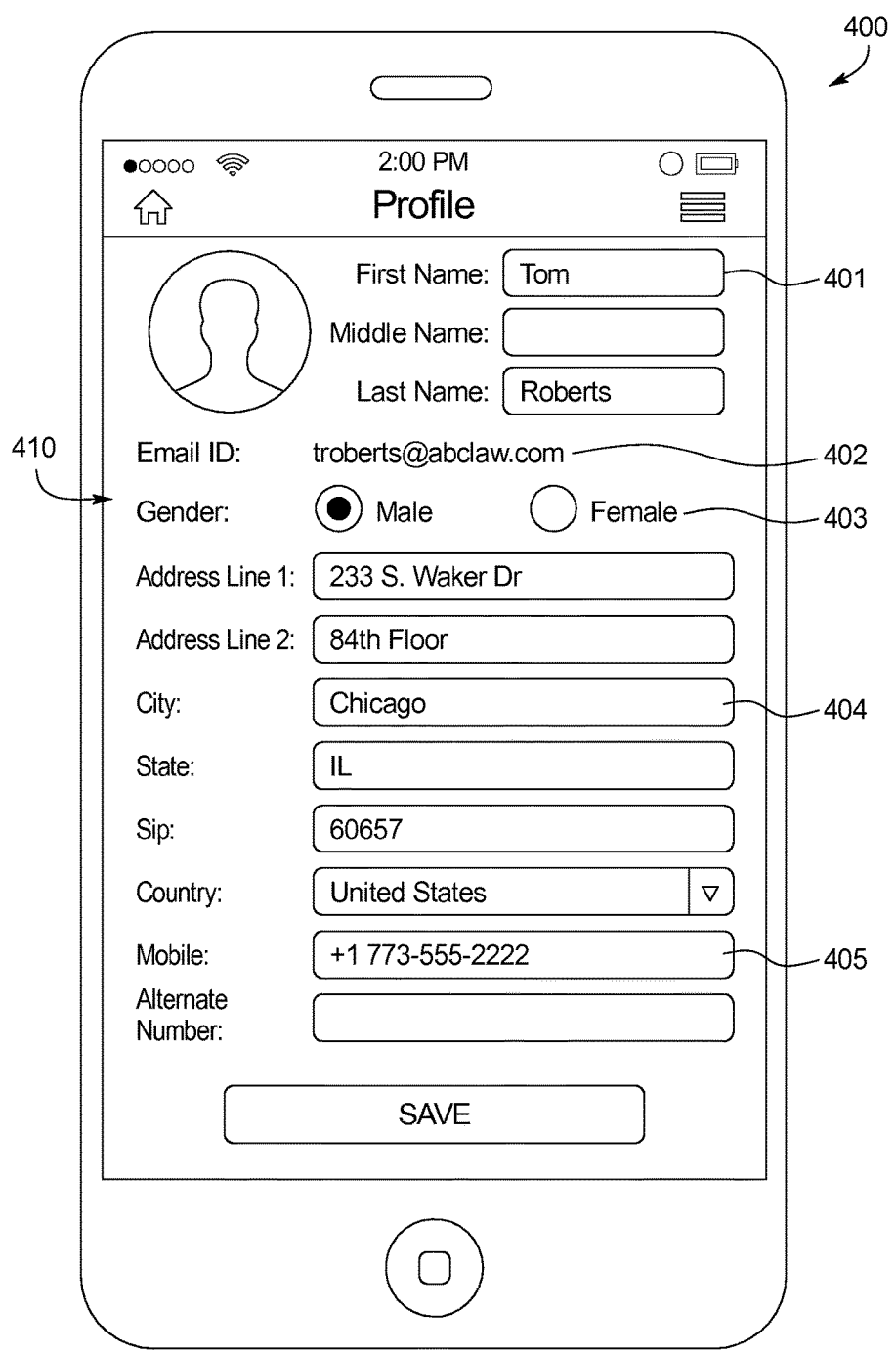
FIG. 4A is an example profile screen of the alert system of FIG. 1 for inputting profile information of a client or caregiver.
Figure 4B:
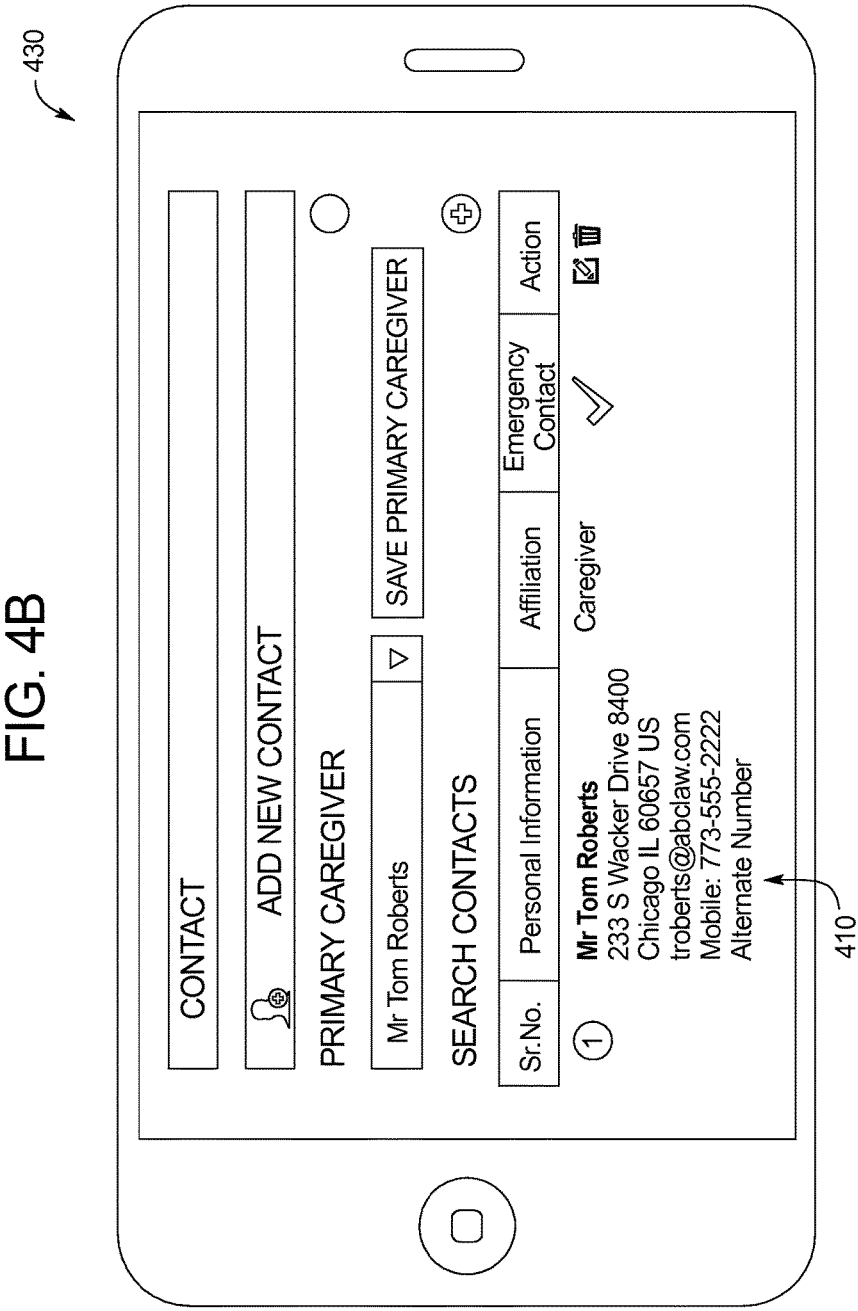
FIG. 4B is an example set primary caregiver screen of the alert system of FIG. 1 that permits a client to select a primary caregiver.

To setup a connection between the client 20 and the caregiver 50 using the alert system 10, the client 20 and caregiver 50 may each first register with alert system 10. FIG. 4a illustrates an example profile screen 400 where either of the client 20 or the caregiver 50 may input profile information 410, such as a name 401, email 402, gender 403, address 404, mobile number 405, etc. Once both the client 20 and the caregiver 50 are registered, the client 20 may associate her profile with profile of the caregiver 50 to permit the caregiver 50 to receive alerts from the client 20. FIG. 4B illustrates a set primary caregiver screen 430 that permits a client 20 to select the profile of caregiver 50 as her primary caregiver 50. The alert system servers 70 may then associate the profile of the client 20 and the profile of the caregiver 50 and forward alerts 40 appropriately.

Once the caregiver 50 is associated with a client 20, the client 20 or caregiver 50 may choose the medium of the alerts 40. For example, the caregiver 50 may choose to receive the alerts 40 as an email, text message, MMS, push notification, phone call, or all five. The client 20 or the caregiver 50 may further customize the text of each alert 40 to match his or her specific needs. For example, the client 20 or the caregiver 50 may input a fall alert message 510 for a fall alert 43, a safe zone message for a safe zone alert 41, a medicine alert message for a medicine alert, an operator alert message for an operator alert 44, an exercise alert message for an exercise alert 45, an emergency alert message for an emergency alert 46, a heart rate alert message for a heart rate alert 47, etc.

Turning to FIGS. 5A-5D, when the alert system 10 detects a fall, the alert system 10 may send a fall alert message 510 to the caregiver mobile device 60 and/or the emergency contacts. Additionally, in some embodiments, the client mobile device 25 may initiate a phone call with the caregiver mobile device 25. To detect falls, the watch 30 may include an accelerometer 240. The accelerometer 240 may be a three-axis accelerometer 240 that record the client's movements. The sensitivity of the accelerometer 240 will allow the alert system 10 to monitor the client's movements and detect a fall condition. The processor 104 may analyze the client's movements using a fall detection algorithms to determine if the client 20 has fallen by meeting a fall condition. For example, a fall may be determined when the magnitude and/or direction of an acceleration, the rate of change of acceleration, or other measured motion of the watch 30 exceeds a threshold or matches a predetermined pattern. In some embodiments, fall detection may be implemented using a 3-D gyroscope in place of or in addition to the accelerometer 240.

Figure 5A:
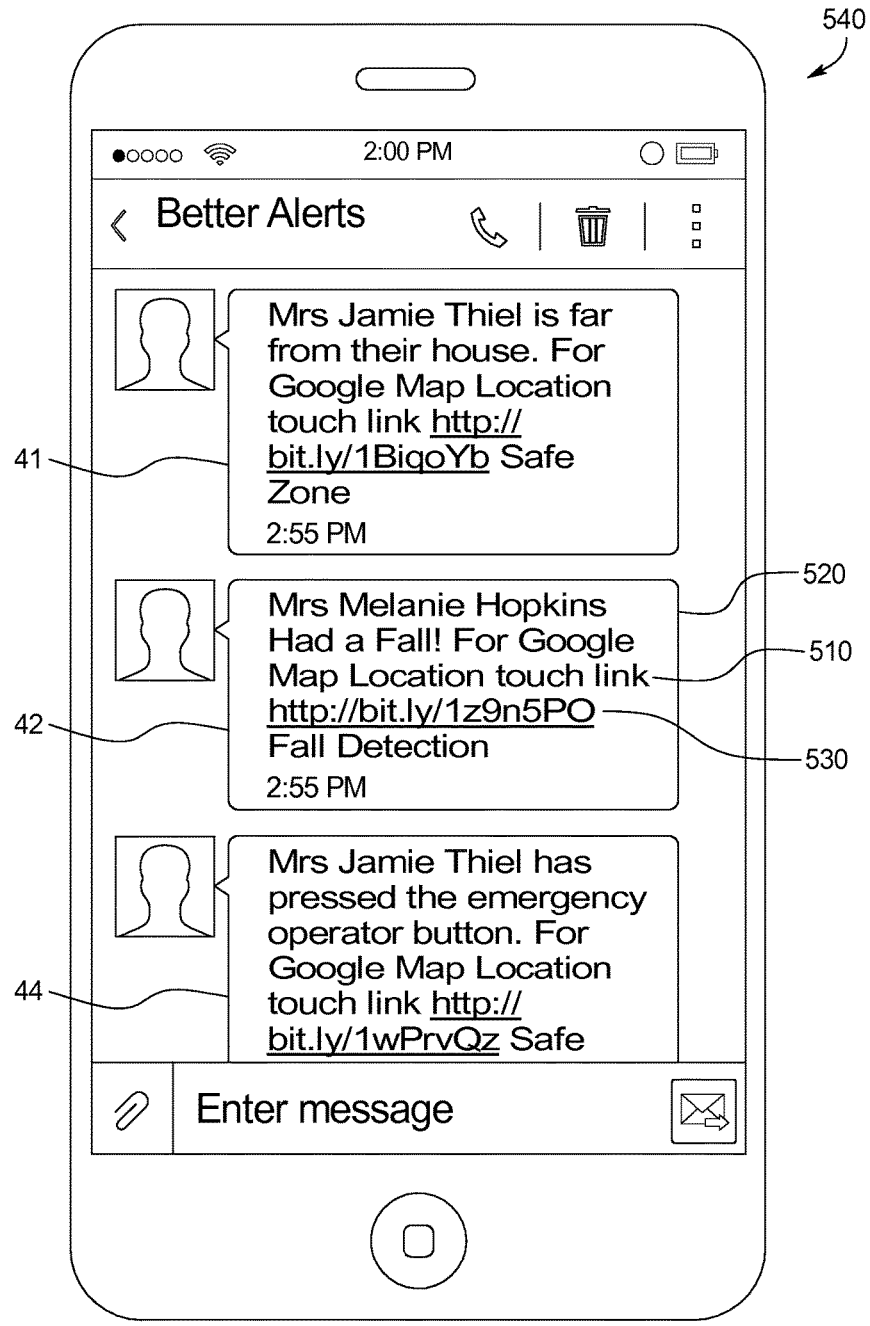
FIG. 5A in an example SMS message screen 500 of the alert system of FIG. 1 for receiving alerts from a client mobile device.
Figure 5B:
FIG. 5B is an example email message screen of the alert system of FIG. 1 including an email alert message.

As shown in FIG. 5A in an SMS message screen 500, the fall alert 43 may be sent as an SMS message 520 including the fall alert message 510. The fall alert message 510 may include a map link 530 to a GPS map 570 to permit a caregiver or emergency contact to access the map 570 (FIG. 5C) showing the current location 580 of the client 20. Likewise, as shown in FIG. 5B in an email message screen 540, the fall alert message 510 may be sent as an email message 550. The email message 550 may also include a map link 530. It is contemplated that any alert 40 of the alert system 10 may be sent as an SMS message 520, MMS, and/or email message 550 and may include a map 570 or map link 530.

FIG. 5C illustrates a map screen 560 including a map 570 of the client's location 580 at the time of an alert 40. When the client 20 moves, the map 570 may be updated to permit the caregiver 50 to track the client 20.

Figure 5D:
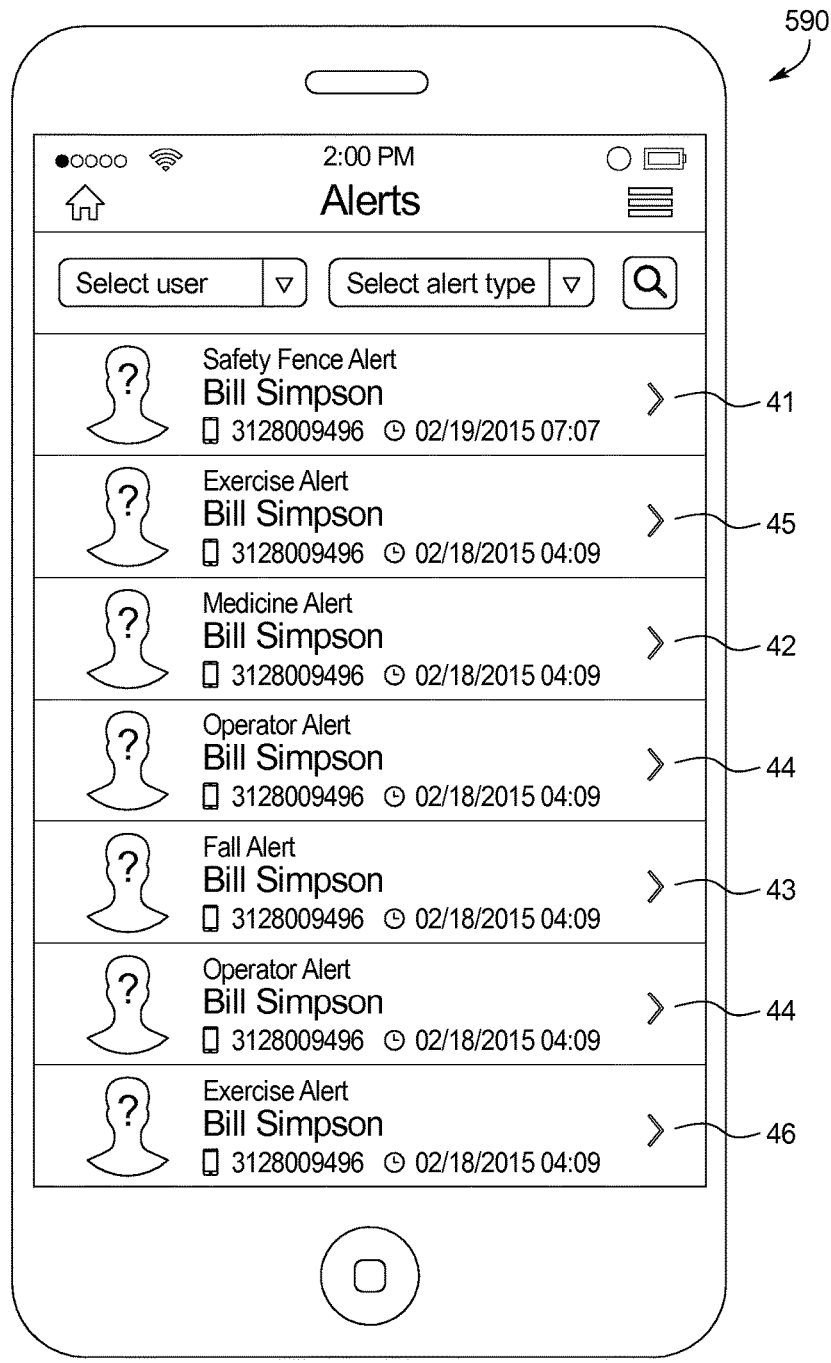
FIG. 5D is an example alert history screen of the alert system of FIG. 1 including a list of received alerts.

FIG. 5D illustrates an alert history screen 590. The alert history screen 590 may include a list of alerts 40 recorded by the alert system 10, such as, safe zone alerts 41, medicine alerts 42, fall alerts 43, operator alerts 44, exercise alerts 45, emergency alerts 46, heart rate alerts 47, etc. Further, the alert system 10 may include collect activity data 870 (FIG. 8B) through the all sensors of the alert system 10 including those in the watch 30 or the client mobile device 25 and may include the activity data 870 inclusion in the alert history screen 590. Additionally, the alert system 10 may provide a mechanism to allow client 20 and their family members or caregivers 50 to generate reports on client activity.

In some embodiments, after sending a fall alert 43 to the caregiver mobile device 60, the alert system 10 may send the display screen 305 on the watch 30 or the client mobile device 25 a message to request that the client 20 verify her safety. If the client 20 fails to respond by pressing a specified one of the user controls 220, the situation may be treated as a crisis and the caregiver 50 may be alerted via the caregiver mobile device 60. In some embodiments, when the system detects a fall, the client mobile application 27 may open an Emergency Contacts screen to permit the client 20 to call for help.

In an embodiment, all of the alerts 40 from the client 20 to the caregiver 50 are provided via push notifications. However, it is believed that there is value in requiring the alerts 40 sent to emergency contacts other than the caregiver 50 to be delivered as SMS message 520 and email messages 550. Additionally, in an embodiment, fall alerts 43, emergency alerts 46, and safe zone alerts 41 may be preprogrammed to be automatically sent to caregivers 50 and emergency contacts, while medicine alert 42, exercise alert 45, and heart rate alerts 47 are only sent to emergency contacts after the client 20 or caregiver 50 has affirmatively chosen to have those alerts 40 sent to the emergency contacts.

The alert system 10 may additionally include a safe zone 605 to prevent a client 20 from wandering away from a safe location. The safe zone 605 may be defined as a geofence. The alert system 10 may monitor the client's location and if the client 20 passes outside the safe zone 605, the caregivers may be alerted. The watch 30 may also include a vibrating motor 240 that may work in conjunction with the safe zone 305, such that the motor activates when the client 20 leaves the safe zone 305 to encourage the client 20 to return to the safe zone 605.

Figure 6:
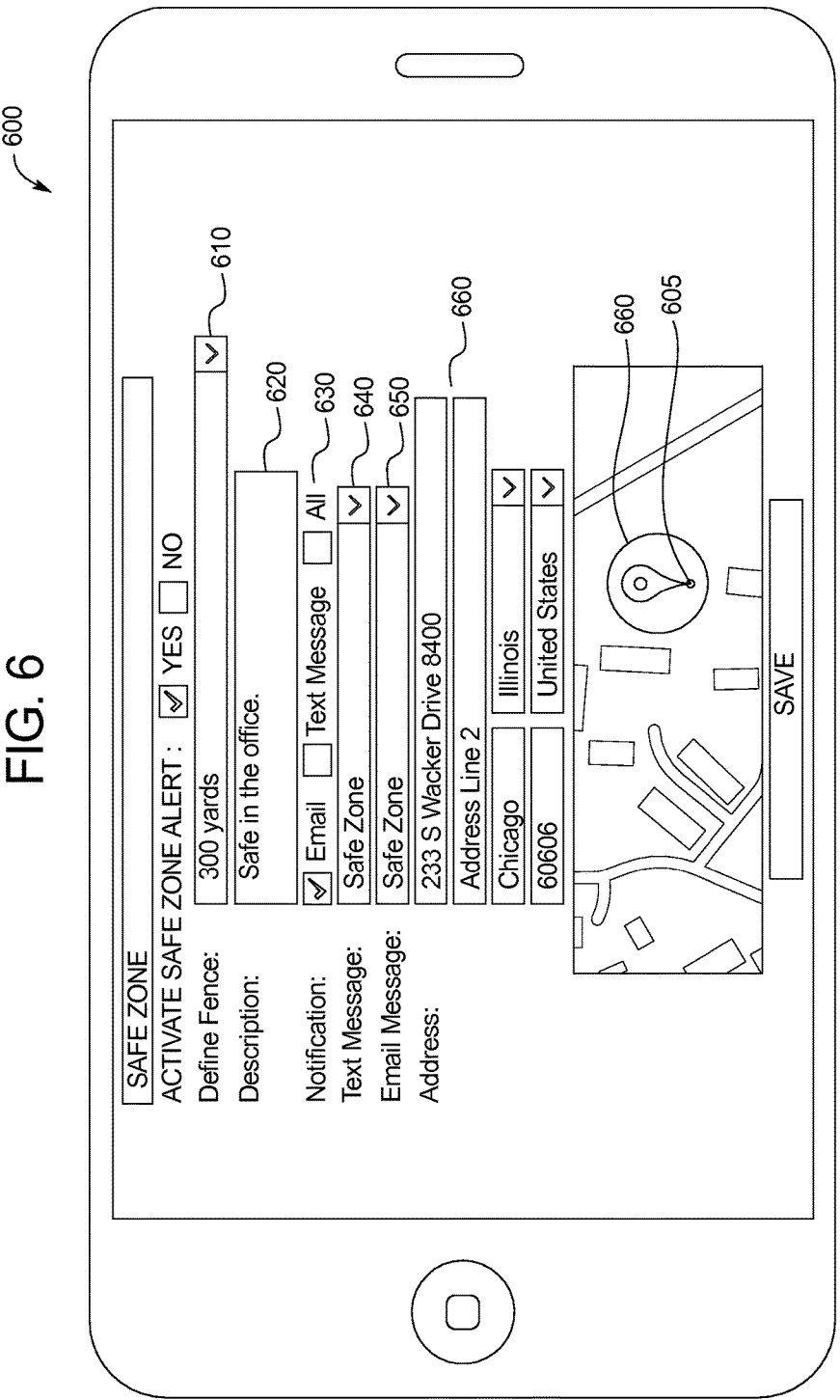
FIG. 6 is an example safe zone setup screen of the alert system of FIG. 1 for configuring a safe zone.

FIG. 6 illustrates a safe zone setup screen 600 for setting up a safe zone 605. In an embodiment, the safe zone 605 may be a circular geofence centered on the address 660 of the client 20. For example, the caregiver 50 may define a fence of 100 meters around the client's residence. The caregiver 50 may input a zone diameter 610 and an address 660 to fully encompass the client's safe location and a zone description 620 of the safe zone 605. Additionally, the caregiver 50 may specify the medium type 630 of the safe zone alert 41 that is triggered when the client 50 leaves the safe zone 605. For example, the caregiver 50 may choose between receiving email alerts 40, text message alerts, or both. The caregiver 50 may also select the contents of the safe zone alert 41 using the text message selection 640 and the email message selection 650.

Figure 7B:
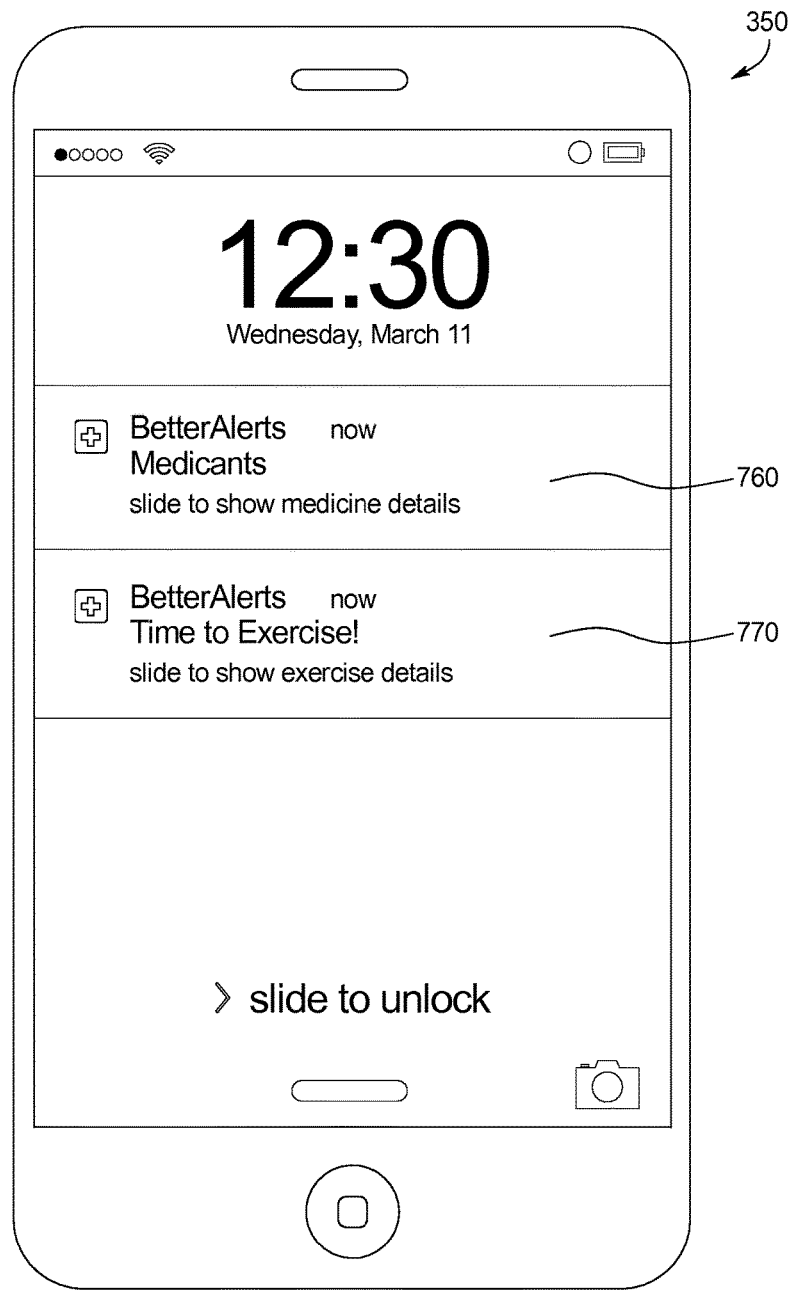
FIG. 7B is an example medicine reminder screen of the alert system of FIG. 1 for reminding the client to take the scheduled medication.
Figure 7C:
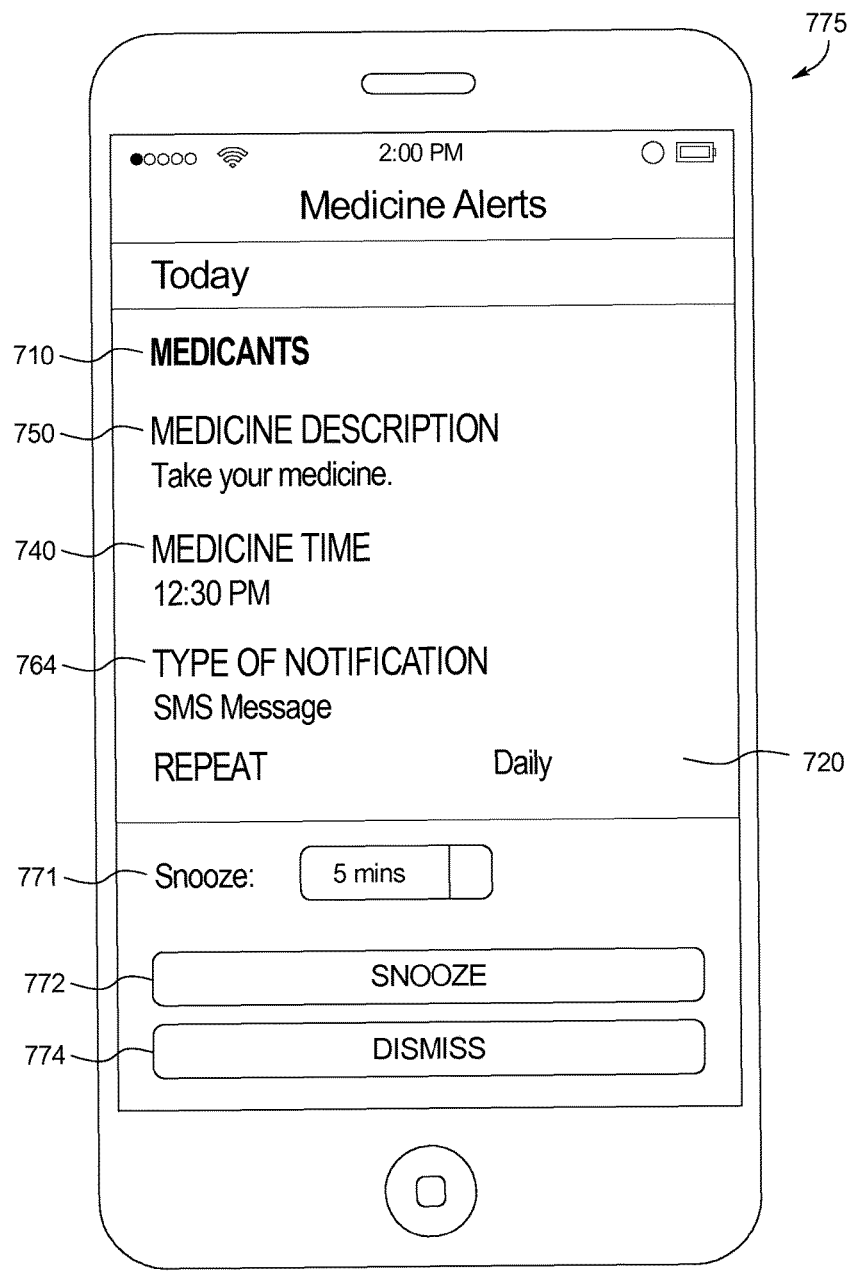
FIG. 7C is an example medicine description screen of the alert system of FIG. 1 for reminding the client to take the scheduled medication.

As shown in FIG. 7A, the client 20 or the caregiver 50 may create medicine alerts 42 and reminders 760 using a Medicine Alerts screen 700 to periodically remind the clients 20 to take her medications. The Medicine Alerts screen 700 may accept the input of the medicine name 710, dose, the repeat type 720 (such as one time, daily, weekly, etc.), the start date 730, the medicine take time 740 (the time the medication is be taken), and a medicine description 750. The client 20 or caregiver 50 may also configure a reminder 760 that may be sent to the client 20 as shown in FIG. 7B on a lock screen 350 of the client mobile device 25. The client 20 may then slide the reminder 760 to view a medicine alert details screen 775 shown in FIG. 7C. On the medicine alert details screen 775, the client 20 may dismiss the reminder 760 after taking the medication, or may choose to delay taking the medication by choosing a timer period 771 and selecting a snooze button 772.

In an embodiment, when the client 20 dismisses the reminder 760 a medicine alert 42 may be sent to the caregiver mobile device 60 to confirm that the medication was taken. The medicine alert 42 may also be added to an activity report 860 (such as FIG. 5D). Additionally, in an embodiment, when the client 20 fails to respond to the reminder 760 or chooses to "snooze" for longer than a predetermined period of time, the alert system 10 may send a medicine alert 42 to caregiver mobile device 60 indicating that the client 20 has failed to take the scheduled medication.

The watch 30 may work in conjunction with the client mobile application 27 and alert system servers 70 to record data regarding the client's daily movements. This activity data 870 may be gathered through the use of a pedometer 260 on the watch 30. The watch 30 may transmit the activity data 870 to the client mobile device 25 and then relayed back to the client 20 via notifications and messages regarding daily steps. The alert system 70 may further analyze this data to learn more about the user's movements and identify potential crises.

To complement the recording of activity data 870, the client mobile application 27 may further include exercise alerts 45 and exercise reminders 770 (FIG. 7B) to encourage the client 20 to maintain activity. The client mobile application 27 may be used to set time-based exercise reminders 770 to the client 20 to perform scheduled exercises. The client mobile application 27 may monitor the activity of the watch 30, for example, via a watch-based pedometer 260, to assist in confirmation of the activity. A record of the measured activity may be transmitted to the alert system servers 70 as confirmation or may be sent to a caregiver 50 as an exercise alert 45 to ensure compliance. The client mobile application 27 may also prompt the client 20 to confirm that the exercise has been completed.

Figure 8A:
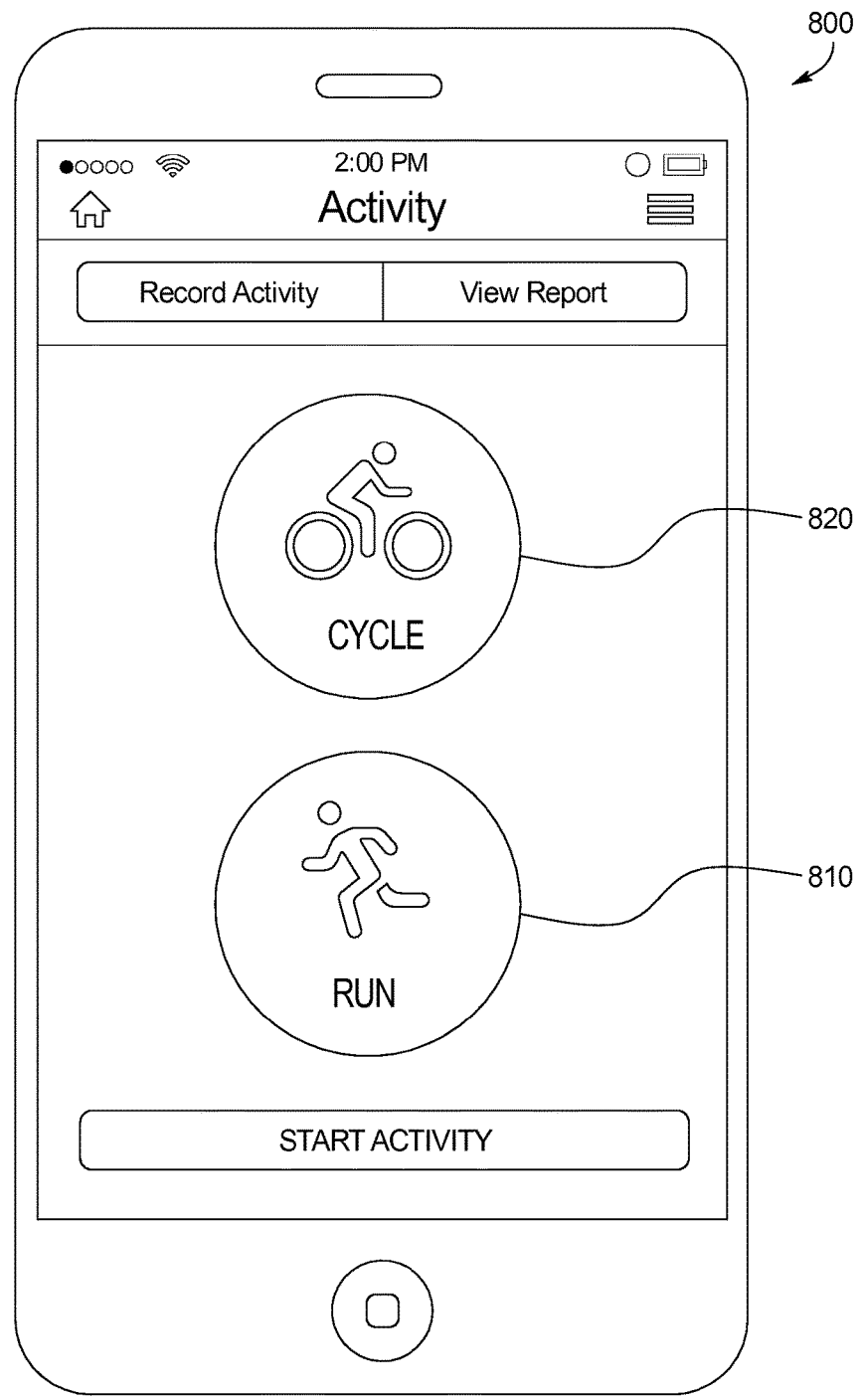
FIG. 8A is an example record activity screen of the alert system of FIG. 1 for recording activity of the client.

As shown in FIG. 8A, the client 20 may manually record the activity using a record activity screen 800. For example, the client 20 may select a running button 810 to record a session of running or walking. To record the activity, the pedometer 260 of the watch 30 may record the number of steps taken during the session. Alternatively, the client 20 may be prompted to enter the number of steps or the amount of time spent walking. As another example, the client 20 may select to record a session of cycling using the cycling button 820.

Figure 8B:
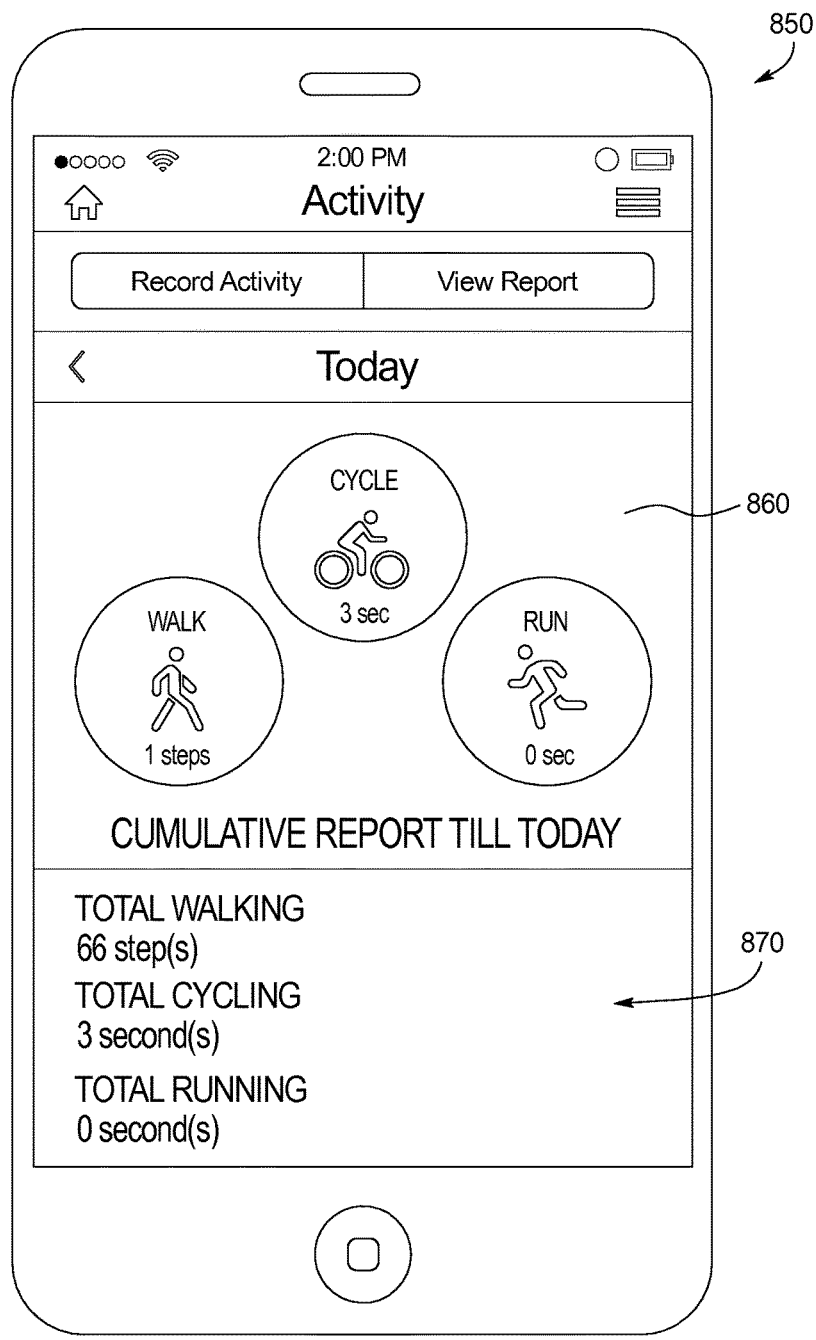
FIG. 8B is an example activity report screen of the alert system of FIG. 1 for reporting the activities of the client.

As shown in FIG. 8B, the client 20 or caregiver 50 may access an activity report screen 850 to view an activity report 860 of the activity recorded by the alert system 10. Activities in the activity report 860 may include any tracked by the alert system 10, for example, in some embodiments, walking, cycling, running, etc. The activity report 860 may be shared with the caregiver 50 for verification, encouragement, etc. The activity report 860 may also highlight goals, illustrate progress towards goals, and otherwise encourage the client 20 to continue with scheduled activity. Similar reports may be generated for medicine alerts 42 to record the compliance of the client 20 with a medication schedule.

The alert system 10 may additionally monitor the user's heart rate. The heart rate may be measured by a heart rate sensor 270 on the watch 30 and routinely transmitted to the alert system servers 70. If the heart rate goes above or below pre-determined thresholds the caregiver 50 or emergency contact may be alerted. For example, if the heart rate exceeds one hundred beats per minute (bpm) or falls below sixty bpm the caregiver may be alerted with a heart rate alert 47 (FIG. 3B).

FIG. 9 illustrates an embodiment of a method 900 that may be executed by the alert system 10 to carry out the functionality described herein. In an embodiment, the method 900 includes the steps of: at step 901, receive, by the client mobile device processor, acceleration data from the accelerometer; at step 902, analyze, by the client mobile device processor, the acceleration data to determine if a fall condition is present; at step 903, when the fall condition is present, communicate, by the client mobile device processor, an alert to the caregiver mobile device, wherein the alert is adapted to indicate that the user wearing the device body has fallen; at step 904, receive, by the caregiver mobile device processor, the alert from the client mobile device processor, via the second wireless communication device; at step 905, display, by the caregiver mobile device processor, a notification of the alert via the first user interface; at step 906, receive, by the caregiver mobile device processor, one or more inputs defining a geofence; at step 907, communicate, by the caregiver mobile device processor, the geofence to the second processor via the first wireless communication module; at step 908, receive, by the client mobile device processor, the geofence via the client mobile device wireless communication module; at step 909, receive, by the client mobile device processor, a current location from the positioning sensor; at step 910, when the current location is outside the geofence, communicate, by the client mobile device processor, a geofence alert to the caregiver mobile device processor, wherein the caregiver mobile device processor displays a notification of the geofence alert on the first user interface; at step 911, receive, by the client mobile device processor, a medication schedule, wherein the medication schedule includes a medicine name and a medication time; at step 912, receive, by the client mobile device processor, a current time from the clock; at step 913, when the current time matches the medication time, display, by the client mobile device processor, a medication reminder on the client mobile device user interface including the medication name, wherein the reminder includes a request to the user to confirm that the medication has be taken, wherein the request is satisfied when the user performs an action; at step 914, when the client mobile device user interface has not detected the action after a predetermined period of time after displaying the alert, communicate, by the client mobile device processor, a medicine alert to the caregiver mobile device, wherein the medicine alert includes a notification of the user's failure to confirm that the medication has been taken; and at step 915, when the second user interface detects the action, communicate by the client mobile device processor, a confirmation alert to the first mobile device.

Referring back to FIG. 2B, the mobile device 100 includes a memory interface 102, one or more data processors, image processors and/or central processors 104, and a peripherals interface 106. The memory interface 102, the one or more processors 104 and/or the peripherals interface 106 can be separate components or can be integrated in one or more integrated circuits. The various components in the mobile device 100 can be coupled by one or more communication buses or signal lines, as will be recognized by those skilled in the art.

Sensors, devices, and additional subsystems can be coupled to the peripherals interface 106 to facilitate various functionalities. For example, a motion sensor 108 (e.g., a gyroscope), a light sensor 110, and a positioning sensor 112 (e.g., GPS receiver) can be coupled to the peripherals interface 106 to facilitate the orientation, lighting, and positioning functions described further herein. Other sensors 114 can also be connected to the peripherals interface 106, such as a proximity sensor, a temperature sensor, a biometric sensor, or other sensing device, to facilitate related functionalities.

A camera subsystem 116 and an optical sensor 118 (e.g., a charged coupled device (CCD) or a complementary metal-oxide semiconductor (CMOS) optical sensor) can be utilized to facilitate camera functions, such as recording photographs and video clips.

Communication functions can be facilitated through one or more wireless communication subsystems 120, which can include radio frequency receivers and transmitters and/or optical (e.g., infrared) receivers and transmitters. The specific design and implementation of the communication subsystem 120 can depend on the communication network(s) over which the mobile device 100 is intended to operate. For example, the mobile device 100 can include communication subsystems 120 designed to operate over a GSM network, a GPRS network, an EDGE network, a Wi-Fi or WiMax network, and a Bluetooth network. In particular, the wireless communication subsystems 120 may include hosting protocols such that the mobile device 100 may be configured as a base station for other wireless devices.

An audio subsystem 122 can be coupled to a speaker 124 and a microphone 126 to facilitate voice-enabled functions, such as voice recognition, voice replication, digital recording, and telephony functions.

The I/O subsystem 128 can include a touch screen controller 130 and/or other input controller(s) 132. The touch-screen controller 130 can be coupled to a user interface 134, such as a touch screen. The user interface 134 and touch screen controller 130 can, for example, detect contact and movement, or break thereof, using any of a plurality of touch sensitivity technologies, including but not limited to capacitive, resistive, infrared, and surface acoustic wave technologies, as well as other proximity sensor arrays or other elements for determining one or more points of contact with the touch screen 134. The other input controller(s) 132 can be coupled to other input/control devices 136, such as one or more buttons, rocker switches, thumb-wheel, infrared port, USB port, and/or a pointer device such as a stylus. The one or more buttons (not shown) can include an up/down button for volume control of the speaker 124 and/or the microphone 126.

The memory interface 102 can be coupled to memory 138. The memory 138 can include high-speed random access memory and/or non-volatile memory, such as one or more magnetic disk storage devices, one or more optical storage devices, and/or flash memory (e.g., NAND, NOR). The memory 138 can store operating system instructions 140, such as Darwin, RTXC, LINUX, UNIX, OS X, iOS, ANDROID, BLACKBERRY OS, BLACKBERRY 10, WINDOWS, or an embedded operating system such as VxWorks. The operating system instructions 140 may include instructions for handling basic system services and for performing hardware dependent tasks. In some implementations, the operating system instructions 140 can be a kernel (e.g., UNIX kernel).

The memory 138 may also store communication instructions 142 to facilitate communicating with one or more additional devices, one or more computers and/or one or more servers 75. The memory 138 may include graphical user interface instructions 144 to facilitate graphic user interface processing; sensor processing instructions 146 to facilitate sensor-related processing and functions; phone instructions 148 to facilitate phone-related processes and functions; electronic messaging instructions 150 to facilitate electronic-messaging related processes and functions; web browsing instructions 152 to facilitate web browsing-related processes and functions; media processing instructions 154 to facilitate media processing-related processes and functions; GPS/Navigation instructions 156 to facilitate GPS and navigation-related processes and instructions; camera instructions 158 to facilitate camera-related processes and functions; and/or other software instructions 160 to facilitate other processes and functions (e.g., access control management functions, etc.). The memory 138 may also store other software instructions controlling other processes and functions of the mobile device 100 as will be recognized by those skilled in the art. In some implementations, the media processing instructions 154 are divided into audio processing instructions and video processing instructions to facilitate audio processing-related processes and functions and video processing-related processes and functions, respectively. An activation record and International Mobile Equipment Identity (IMEI) 162 or similar hardware identifier can also be stored in memory 138.

Each of the above identified instructions and applications can correspond to a set of instructions for performing one or more functions described herein. These instructions need not be implemented as separate software programs, procedures, or modules. The memory 138 can include additional instructions or fewer instructions. Furthermore, various functions of the mobile device 100 may be implemented in hardware and/or in software, including in one or more signal processing and/or application specific integrated circuits. Accordingly, the mobile device 100, as shown in FIG. 2B, may be adapted to perform any combination of the functionality described herein.

One or more processors 104 control aspects of the systems and methods described herein. The one or more processors 104 may be adapted run a variety of application programs, access and store data, including accessing and storing data in associated databases, and enable one or more interactions via the mobile device 100. Typically, the one or more processors 104 are implemented by one or more programmable data processing devices. The hardware elements, operating systems, and programming languages of such devices are conventional in nature, and it is presumed that those skilled in the art are adequately familiar therewith.

For example, the one or more processors 104 may be a PC based implementation of a central control processing system utilizing a central processing unit (CPU), memories and an interconnect bus. The CPU may contain a single microprocessor, or it may contain a plurality of microprocessors 104 for configuring the CPU as a multi-processor system. The memories include a main memory, such as a dynamic random access memory (DRAM) and cache, as well as a read only memory, such as a PROM, EPROM, FLASH-EPROM, or the like. The system may also include any form of volatile or non-volatile memory. In operation, the main memory stores at least portions of instructions for execution by the CPU and data for processing in accord with the executed instructions.

The one or more processors 104 may also include one or more input/output interfaces for communications with one or more processing systems. Although not shown, one or more such interfaces may enable communications via a network, e.g., to enable sending and receiving instructions electronically. The communication links may be wired or wireless.

The one or more processors 104 may further include appropriate input/output ports for interconnection with one or more output displays (e.g., monitors, printers, touchscreen 134, motion-sensing input device 108, etc.) and one or more input mechanisms (e.g., keyboard, mouse, voice, touch, bioelectric devices, magnetic reader, RFID reader, barcode reader, touchscreen 134, motion-sensing input device 108, etc.) serving as one or more user interfaces for the processor. For example, the one or more processors 104 may include a graphics subsystem to drive the output display. The links of the peripherals to the system may be wired connections or use wireless communications.

Although summarized above as a PC-type implementation, those skilled in the art will recognize that the one or more processors 104 also encompasses systems such as host computers, servers, workstations, network terminals, and the like. Further one or more processors 104 may be embodied in a mobile device 100, such as a mobile electronic device, like a smartphone or tablet computer. In fact, the use of the term processor is intended to represent a broad category of components that are well known in the art.

Hence aspects of the systems and methods provided herein encompass hardware and software for controlling the relevant functions. Software may take the form of code or executable instructions for causing a processor or other programmable equipment to perform the relevant steps, where the code or instructions are carried by or otherwise embodied in a medium readable by the processor or other machine. Instructions or code for implementing such operations may be in the form of computer instruction in any form (e.g., source code, object code, interpreted code, etc.) stored in or carried by any tangible readable medium.

As used herein, terms such as computer or machine "readable medium" refer to any medium that participates in providing instructions to a processor for execution. Such a medium may take many forms. Non-volatile storage media include, for example, optical or magnetic disks, such as any of the storage devices in any computer(s) shown in the drawings. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD, any other optical medium, punch cards paper tape, any other physical medium with patterns of holes, a RAM, a PROM and EPROM, a FLASH-EPROM, any other memory chip or cartridge, or any other medium from which a computer can read programming code and/or data. Many of these forms of computer readable media may be involved in carrying one or more sequences of one or more instructions to a processor for execution.

It should be noted that various changes and modifications to the presently preferred embodiments described herein will be apparent to those skilled in the art. Such changes and modifications may be made without departing from the spirit and scope of the present invention and without diminishing its attendant advantages.

The invention claimed is:

1. A system for sending medical emergency alerts comprising:
   a device body adapted to be attached to a user, the device body including
     an accelerometer,
     a first wireless communications module in communication with the accelerometer;
     a user interface; and
   a user device including a processor and a second wireless communications module, the second wireless communications module controlled by the processor, the second wireless communications module in wireless communication to communicate with the accelerometer and the user interface, wherein the second wireless communications module includes a database storing a plurality of contacts associated with the user, wherein at least one contact is an emergency contact, and
   a memory in communication with the processor, the memory including instructions that, when executed by the processor, cause the processor to
     receive acceleration data from the accelerometer,
     analyze the acceleration data to determine if a fall condition is present, and
     when the fall condition is present, communicate, via the second wireless communication module, a fall alert to a caregiver mobile device, wherein the fall alert is adapted to indicate that the user wearing the device body has fallen,
   wherein when the fall condition is present, send a communication, via the user device, to at least one emergency contact associated with the user, wherein the communication indicates that the user wearing the device body has fallen;
   receive a medication schedule, wherein the medication schedule includes a medicine name and a medication time;
   receive a current time from the clock;
   when the current time matches the medication time, displaying a medication reminder on the user interface including the medication name, wherein the medication reminder includes a request to the user to confirm that a medication has been taken, wherein the request is satisfied when the user performs a predefined action;
   wherein when the user interface has not detected the action after a predetermined period of time after displaying the medication reminder, communicate a medicine alert to the caregiver mobile device, wherein the medicine alert includes a notification of the user's failure to confirm that the medication has been taken;
   wherein the medicine alert is sent to the emergency contact only after the caregiver has chosen to have the medicine alert sent to the emergency contact.

2. The system of claim 1, wherein the device body further includes a positioning sensor in communication with the processor, wherein the memory includes further instructions that cause the processor to:
   receive a geofence via the second wireless communication module,
   receive a current location from the positioning sensor, and
   when the current location is outside the geofence, communicate a geofence alert to the caregiver mobile device.

3. The system of claim 2, wherein the device body includes a vibrating motor, wherein the vibrating motor vibrates when the user leaves the geofence.

4. The system of claim 1, wherein the memory further includes instruction to: when the user interface detects the action, communicate, to the caregiver mobile device, a medicine confirmation alert adapted to notify a caregiver that the medication has been taken.

5. The system of claim 1, further including a mobile telephone unit in communication with the processor, wherein the mobile telephone unit is adapted to provide mobile telephone call functionality, wherein when the fall condition is present, initiating a mobile telephone call with an emergency service line.

6. The system of claim 1, further including a mobile telephone unit in communication with the processor, wherein the mobile telephone unit is adapted to provide mobile telephone call functionality, wherein when the fall condition is present, initiating a mobile telephone call with the caregiver mobile device.

7. The system of claim 1, further including a pedometer in communication with the processor.

8. The system of claim 1, further including a heart rate monitor in communication with the processor.

9. A system for sending medical emergency alerts comprising:
   a device body adapted to be attached to a user, the device body including
     an accelerometer;
   a first mobile device including a first wireless communications module, a first user interface, a first memory, and a first processor in communication with the first wireless communications module, the first user interface, and the first memory;
   a second mobile device including
     a second wireless communications module in communication with the first wireless communications module, wherein the second wireless communications module includes a database storing a plurality of contacts associated with the user, wherein at least one contact is an emergency contact,
     a second user interface,
     a second processor in communication with the accelerometer, the second wireless communications module, and the second user interface,
     a second memory in communication with the second processor, the second memory including instructions that, when executed by the second processor, cause the second processor to receive acceleration data from the accelerometer,
analyze the acceleration data to determine if a fall condition is present,
when the fall condition is present, communicate, via the second wireless communications module, an alert to the first mobile device, wherein the alert is adapted to indicate that the user wearing the device body has fallen,
wherein when the fall condition is present, send an SMS message to at least one emergency contact associated with the user, wherein the SMS message indicates that the user wearing the device body has fallen;
wherein the first memory includes instructions that, when executed by the first processor, cause the first processor to
receive the alert from the second mobile device, and
display a notification of the alert via the first user interface;
wherein at least one of the second memory and the first memory include instructions to:
receive a medication schedule, wherein the medication schedule includes a medicine name and a medication time,
wherein the second memory includes instructions to:
receive a current time from the clock,
when the current time matches the medication time, display a medication reminder on the second user interface including the medication name, wherein the reminder includes a request to the user to confirm that the medication has been taken, wherein the request is satisfied when the user performs an action,
when the second user interface has not detected the action after a predetermined period of time after displaying the medication reminder, communicate a medicine alert to the first mobile device, wherein the medicine alert includes a notification of the user's failure to confirm that the medication has been taken;
wherein the medicine alert is sent to the emergency contact only after the caregiver has chosen to have the medicine alert sent to the emergency contact.

10. The system of claim 9, wherein the device body further includes a positioning sensor in communication with the second processor, wherein the first memory includes further instructions that cause the first processor to:
receive one or more inputs defining a geofence, and
communicate the geofence to the second processor via the first wireless communication module, and
wherein the second memory includes further instructions that cause the second processor to:
receive the geofence via the second wireless communication module,
receive a current location from the positioning sensor, and
when the current location is outside the geofence, communicate a geofence alert to the first processor, wherein the first processor displays a geofence alert notification on the first user interface.

11. The system of claim 9, wherein the second memory further includes instruction to: when the second user interface detects the action, communicate a medicine confirmation alert to the first mobile device.

12. The system of claim 9, further including a mobile telephone unit in communication with the second processor, wherein the mobile telephone unit is adapted to provide mobile telephone call functionality, wherein when the fall condition is present, initiating a mobile telephone call with an emergency service line.

13. The system of claim 9, further including a second mobile telephone unit in communication with the second processor, further including a first mobile telephone unit in communication with the first processor, wherein the second mobile telephone unit and the first mobile telephone unit are adapted to provide mobile telephone call functionality, wherein, when the fall condition is present, initiating a mobile telephone call between the second mobile telephone unit and the first mobile telephone unit.

14. The system of claim 9, further including a pedometer in communication with the second processor.

15. The system of claim 1, wherein the processor is further configured to:
in response to determining a fall condition, the processor displays, via the user interface a prompt requesting safety verification by pressing a specified control on the user interface,
in response to detecting the user pressed the specified control, refraining from executing the step of communicating an alert to a caregiver mobile device, and
in response to failing to detect the user pressed the specified control, communicating to a caregiver mobile device that the user failed to confirm his or her safety.

16. The system of claim 9, wherein the processor is further configured to:
in response to determining a fall condition, the processor displays, via the user interface a prompt requesting safety verification by pressing a specified control on the user interface,
in response to detecting the user pressed the specified control, refraining from executing the step of communicating an alert to a caregiver mobile device, and
in response to failing to detect the user pressed the specified control, communicating to a caregiver mobile device that the user failed to confirm his or her safety.

17. The system of claim 9, wherein via the second wireless communications module processor, when the second user interface has not detected the action after a predetermined period of time after displaying the medication reminder, communicate a medicine alert to, send an SMS message to at least one emergency contact associated with the user, wherein the SMS message indicates a medicine alert.

* * * * *